US009695782B2

(12) United States Patent
Tamura et al.

(10) Patent No.: US 9,695,782 B2
(45) Date of Patent: Jul. 4, 2017

(54) ABNORMALITY DIAGNOSIS DEVICE FOR EVAPORATED-GAS PURGING SYSTEM

(71) Applicant: DENSO CORPORATION, Kariya, Aichi-pref. (JP)

(72) Inventors: Ryo Tamura, Kariya (JP); Daiji Isobe, Toyohashi (JP)

(73) Assignee: DENSO CORPORATION, Kariya (JP)

( * ) Notice: Subject to any disclaimer, the term of this patent is extended or adjusted under 35 U.S.C. 154(b) by 274 days.

(21) Appl. No.: 14/736,645

(22) Filed: Jun. 11, 2015

(65) Prior Publication Data

US 2015/0361929 A1 Dec. 17, 2015

(30) Foreign Application Priority Data

Jun. 13, 2014 (JP) ................................ 2014-122598

(51) Int. Cl.
*G01M 15/04* (2006.01)
*F02M 25/08* (2006.01)

(52) U.S. Cl.
CPC .... *F02M 25/0818* (2013.01); *F02M 25/0809* (2013.01)

(58) Field of Classification Search
USPC ....................................................... 73/114.39
See application file for complete search history.

(56) References Cited

U.S. PATENT DOCUMENTS

| | | | | |
|---|---|---|---|---|
| 6,848,298 B2 * | 2/2005 | Miyahara | F02M 25/0818 702/51 |
| 9,389,142 B2 * | 7/2016 | Tamura | G01M 15/04 |
| 2001/0004844 A1 * | 6/2001 | Yamaki | F02M 25/0809 73/40.5 R |
| 2001/0027682 A1 * | 10/2001 | Takagi | F02M 25/0818 73/114.41 |
| 2002/0189328 A1 * | 12/2002 | Saito | F02M 25/0809 73/49.7 |
| 2002/0189596 A1 * | 12/2002 | Hanazaki | F02M 25/0809 123/520 |
| 2003/0061871 A1 * | 4/2003 | Oki | F02M 25/0827 73/114.41 |
| 2003/0131655 A1 * | 7/2003 | Miyahara | F02M 25/0818 73/37 |
| 2006/0272400 A1 * | 12/2006 | Wakahara | F02M 25/0809 73/114.37 |

(Continued)

*Primary Examiner* — Eric S McCall
(74) *Attorney, Agent, or Firm* — Nixon & Vanderhye PC

(57) ABSTRACT

An abnormality diagnosis device introduces a pressure into a reference-pressure detecting portion by utilizing a pressure introducing portion to detect a reference pressure correlative to a reference orifice, detects a purge-valve closed pressure that is a pressure in an evaporation system of when a pressure is introduced into the evaporation system by the pressure introducing portion after the purge valve is controlled to be closed, and detects a purge-valve open pressure that is a pressure in the evaporation system of when a pressure is introduced into the evaporation system by the pressure introducing portion after the purge valve is controlled to be open. The abnormality diagnosis device determines whether a leakage abnormality of the evaporation system and a fixed open abnormality are generated, based on a magnitude relation between the reference pressure, the purge-valve closed pressure, and the purge-valve open pressure.

4 Claims, 14 Drawing Sheets

(56) References Cited

U.S. PATENT DOCUMENTS

| | | | | |
|---|---|---|---|---|
| 2014/0116401 A1* | 5/2014 | Horiba | F02M 25/0809 | 123/520 |
| 2014/0224212 A1* | 8/2014 | Tamura | G01M 15/04 | 123/434 |
| 2016/0017849 A1* | 1/2016 | Shirai | F02D 41/004 | 123/520 |

* cited by examiner

ABNORMALITY DIAGNOSIS DEVICE FOR EVAPORATED-GAS PURGING SYSTEM

CROSS REFERENCE TO RELATED APPLICATION

This application is based on Japanese Patent Application No. 2014-122598 filed on Jun. 13, 2014, the disclosure of which is incorporated herein by reference.

TECHNICAL FIELD

The present disclosure relates to an abnormality diagnosis device for an evaporated-gas purging system which purges or discharges an evaporated gas generated according to an evaporation of a fuel in a fuel tank to an intake system of an internal combustion engine.

BACKGROUND

Conventionally, in a vehicle provided with an internal combustion engine, an evaporated-gas purge system is used to prevent from discharging an evaporated gas generated in a fuel tank to the atmosphere. In the evaporated-gas purge system, the evaporated gas generated in the fuel tank is adsorbed in a canister, and a purge valve provided in a purge passage communicating with the canister and an intake system of the internal combustion engine is open. Therefore, the evaporated gas adsorbed at the canister is purged to the intake system according to a negative pressure of the intake system. The negative pressure corresponds to an intake negative-pressure. It is necessary to detect a leakage of the evaporated gas in an early stage to prevent from leaving a leakage state of the evaporated gas purged from the evaporated-gas purge system to the atmosphere.

JP-2003-269265A (US 2003/0131655A1) discloses a technology of detecting a leakage of an evaporation system from a fuel tank to a purge valve. Specifically, a leakage-checking module including a pressure sensor, an air pump, a reference-pressure detecting portion including a reference hole, and a passage-switching valve is connected to a canister of an evaporated-gas purge system. After the air pump introduces a pressure into the reference-pressure detecting portion to detect a reference pressure correlative to the reference hole, a pressure introducing passage is switched by utilizing the passage-switching valve, the pressure is introduced into the evaporation system of when the purge valve is closed and then the pressure in the evaporation system is detected, and a leakage abnormality is determined by comparing the reference pressure and the pressure in the evaporation system. When a negative pressure is introduced into the reference-pressure detecting portion and the reference pressure is lower than the pressure in the evaporation system, the leakage abnormality is determined to be generated. When the purge valve is controlled to be open and the pressure in the evaporation system is not increased after the pressure in the evaporation system is detected, a fixed closed abnormality of the purge valve in which the purge valve is fixed to be closed is determined.

SUMMARY

However, in the evaporated-gas purge system, it is possible that a fixed open abnormality that the purge valve is fixed to be slightly open (in a non-fully closed state) is generated other than the leakage abnormality that the evaporated gas is leaked from the leakage hole to the atmosphere and the fixed closed abnormality that the purge valve is fixed to be closed.

According to JP-2003-269265A, when the negative pressure is introduced into the reference-pressure detecting portion and the fixed open abnormality of the purge valve is generated, the reference pressure of when a leakage diagnosis is executed is lower than the pressure in the evaporation system. Therefore, the leakage abnormality may be erroneously determined to be generated even though the leakage abnormality is not generated. When the fixed open abnormality of the purge valve is generated and the purge valve is controlled to be open after the pressure in the evaporation system is detected, the pressure in the evaporation system is not increased. Therefore, the fixed closed abnormality of the purge valve may be erroneously determined to be generated. Thus, the fixed open abnormality of the purge valve cannot be differed from other abnormalities including the leakage abnormality and the fixed closed abnormality. In addition, the similar matter occurs in a case where a positive pressure is introduced into the reference-pressure detecting portion.

The present disclosure is made in view of the above matters, and it is an object of the present disclosure to provide an abnormality diagnosis device for an evaporated-gas purging system which can detect and distinguish a fixed open abnormality of a purge valve from other abnormalities.

According to an aspect of the present disclosure, an abnormality diagnosis device is applied to an evaporated-gas purge system including a purge valve opening and closing a purge passage purging an evaporated gas generated according to an evaporation of a fuel in a fuel tank to an intake system of an internal combustion engine. The abnormality diagnosis device includes a pressure introducing portion, a pressure detecting portion, a reference-pressure detecting portion, and an abnormality diagnosis portion. The pressure introducing portion introduces a pressure into an evaporation system from the fuel tank to the purge valve. The pressure detecting portion detects a pressure in the evaporation system. The reference-pressure detecting portion includes a reference orifice having a predetermined diameter. The abnormality diagnosis portion executes (i) a reference-pressure detecting operation to introduce a pressure into the reference-pressure detecting portion by utilizing the pressure introducing portion so as to detect a reference pressure correlative to the reference orifice, (ii) a first evaporation-system pressure detecting operation to detect a purge-valve closed pressure that is a pressure in the evaporation system of when a pressure is introduced into the evaporation system by the pressure introducing portion after the purge valve is controlled to be closed, and (iii) a second evaporation-system pressure detecting operation to detect a purge-valve open pressure that is a pressure in the evaporation system of when a pressure is introduced into the evaporation system by the pressure introducing portion after the purge valve is controlled to be open. The abnormality diagnosis portion determines whether a leakage abnormality of the evaporation system and a fixed open abnormality of the purge valve in which the purge valve is fixed to be open are generated, based on a magnitude relation between the reference pressure, the purge-valve closed pressure, and the purge-valve open pressure.

As the above description, when the evaporated-gas purge system is normal and the leakage abnormality of the evaporation system is generated and the fixed closed abnormality of the purge valve is generated and the fixed open abnormality of the purge valve is generated, the magnitude relation between the reference pressure, the purge-valve closed pressure, and the purge-valve open pressure differs. Therefore, the leakage abnormality of the evaporation system, the fixed open abnormality of the purge valve, and the fixed closed abnormality of the purge valve are determined by comparing the purge-valve closed pressure with the reference pressure and the purge-valve open pressure. Thus, the fixed open abnormality of the purge valve can be detected and distinguished from other abnormalities including the leakage abnormality and the fixed closed abnormality of the purge valve.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
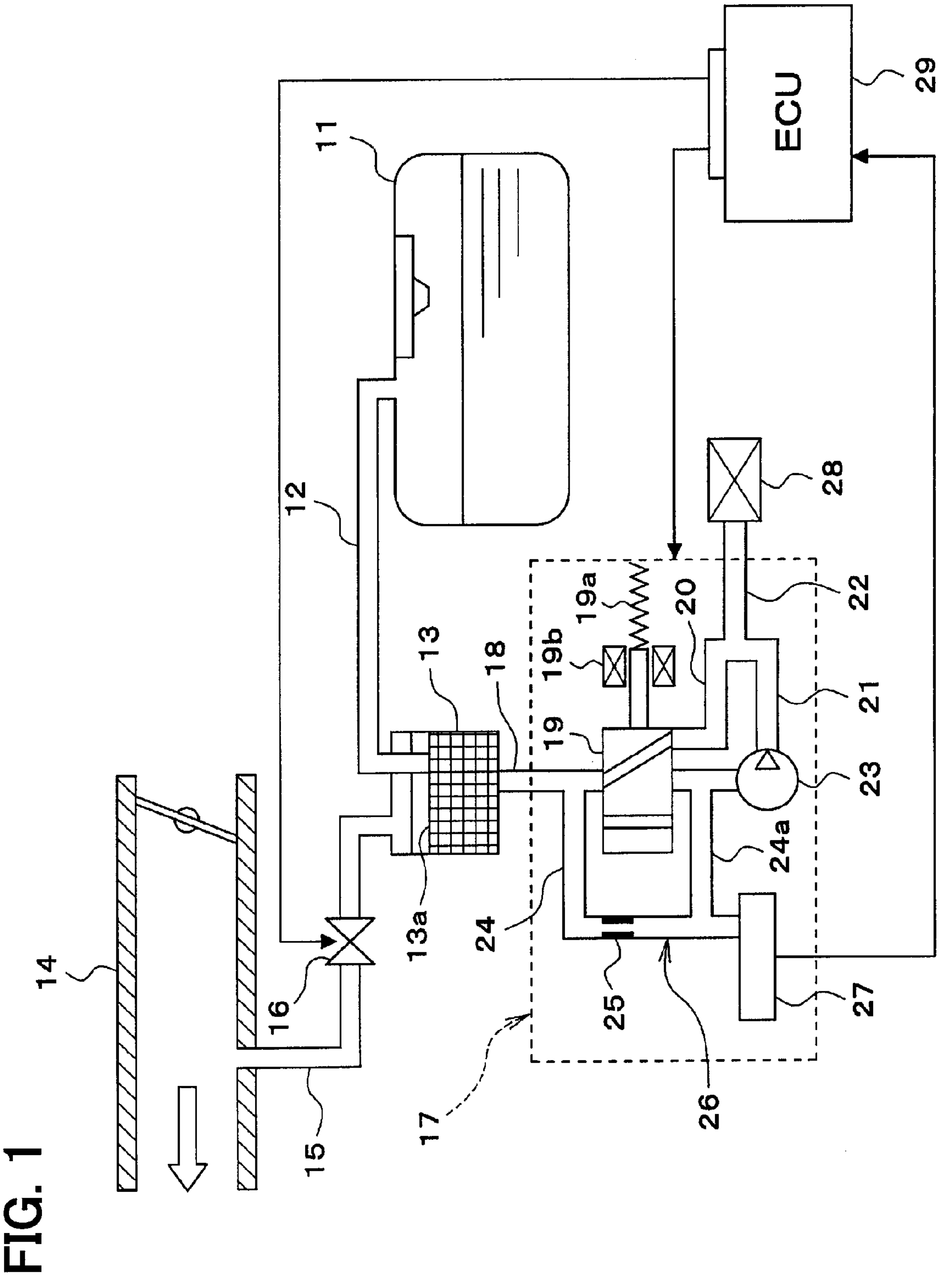
FIG. 1 is a schematic diagram showing an outline of an evaporated-gas purge system according to a first embodiment of the present disclosure.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

Hereafter, embodiments of the present disclosure will be detailed.

First Embodiment

A first embodiment of the present disclosure will be described with reference to FIGS. 1 to 9.

First, referring to FIG. 1, a configuration of an evaporated-gas purge system will be detailed.

A tank 11 is connected with a canister 13 via an evaporation passage 12. The canister 13 receives an adsorber **13*a* adsorbing an evaporated gas generated according to an evaporation of a fuel in the tank 11. For example, the adsorber 13*a*** may be an activated carbon. According to the present embodiment, the evaporated gas indicates a fuel evaporated gas.

A purge passage 15 is provided between the canister 13 and an intake pipe 14 of an engine, and purges or discharges the evaporated gas adsorbed in the adsorber **13*a* to the intake pipe 14. The intake pipe 14 corresponds to an intake system, and the engine corresponds to an internal combustion engine. A purge valve 16 is provided in the purge passage 15 to adjust a purging flow-volume in the purge passage 15. For example, the purge valve 16 is constructed by a normally closed electromagnetic valve, and is energized by a duty control to adjust the purging flow-volume of the evaporated gas flowing from the canister 13 to the intake pipe 14. When an energization duty is 0%, the purge valve 16 is fully closed to close the purge passage 15. When the energization duty is 100%, the purge valve 16 is fully open to open the purge passage 15. Further, an opening degree of the purge valve 16 varies according to the energization duty between 0% and 100%. Therefore, an open-closed state (an open level) of the purge passage 15** varies, and a purge quantity of the evaporated gas varies.

A leakage-checking module 17 is mounted to the canister 13 to execute a leakage abnormality diagnosis of an evaporation system from the tank 11 to the purge valve 16. In this case, the evaporation system includes the tank 11, the evaporation passage 12, the canister 13, the purge passage 15, and the purge valve 16. In the leakage-checking module 17, a canister communication passage 18 communicating with the canister 13 is connected with an atmosphere introducing passage 20 or a pump-pressure introducing passage 21 via a passage-switching valve 19. The atmosphere introducing passage 20 and the pump-pressure introducing passage 21 are both connected with the atmosphere communication passage 22 communicating with the atmosphere. The atmosphere communication passage 22 has a tip end provided with a filter 28 removing foreign matters from an external. According to the present embodiment, the foreign matters include trash or dust.

The pump-pressure introducing passage 21 is provided with a negative-pressure pump 23. According to the present embodiment, the negative-pressure pump 23 is a pressure introducing portion. The negative-pressure pump 23 is an electrical air pump driven by a motor. The negative-pressure pump 23 introduces a negative pressure in the evaporation system. In other words, the negative-pressure pump 23 feeds a gas from the canister communication passage 18 towards the atmosphere communication passage 22. According to the present embodiment, the negative pressure is lower than an atmospheric pressure.

Figure 2:
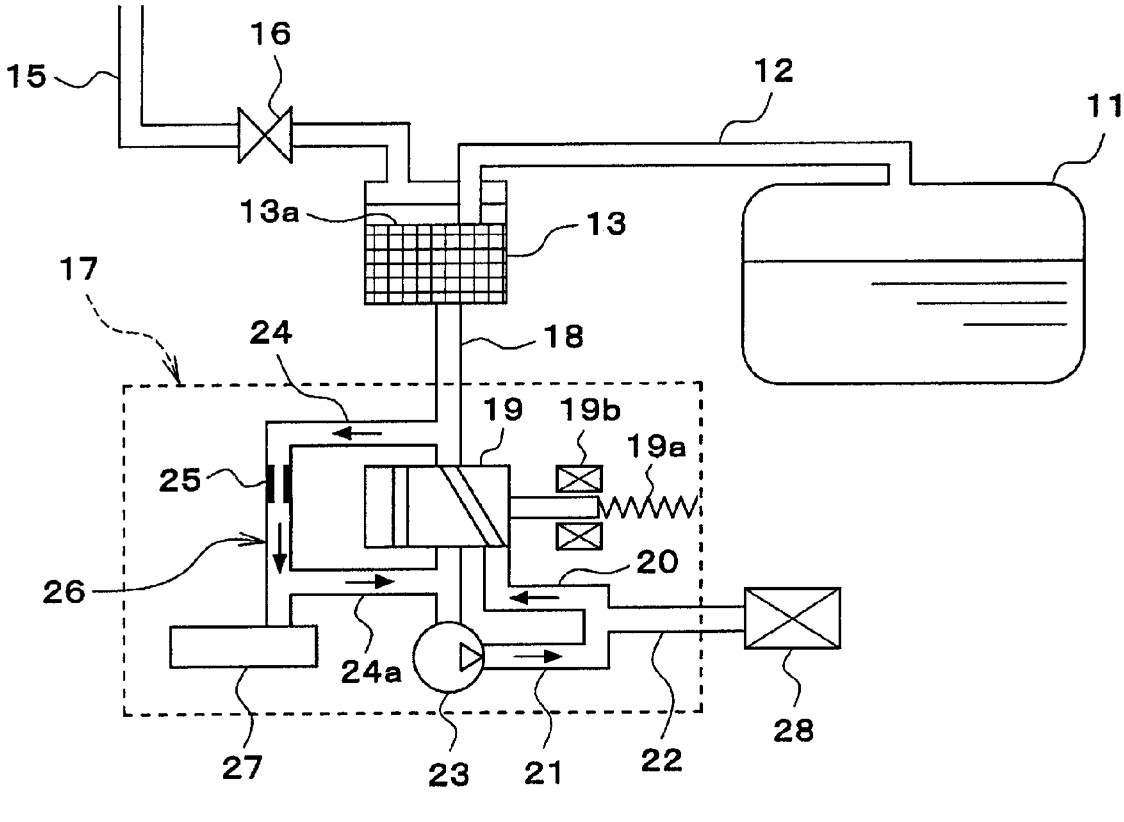
FIG. 2 is a schematic diagram showing an outline of a leakage-checking module indicating a reference-pressure detecting state, according to the first embodiment.
Figure 3:
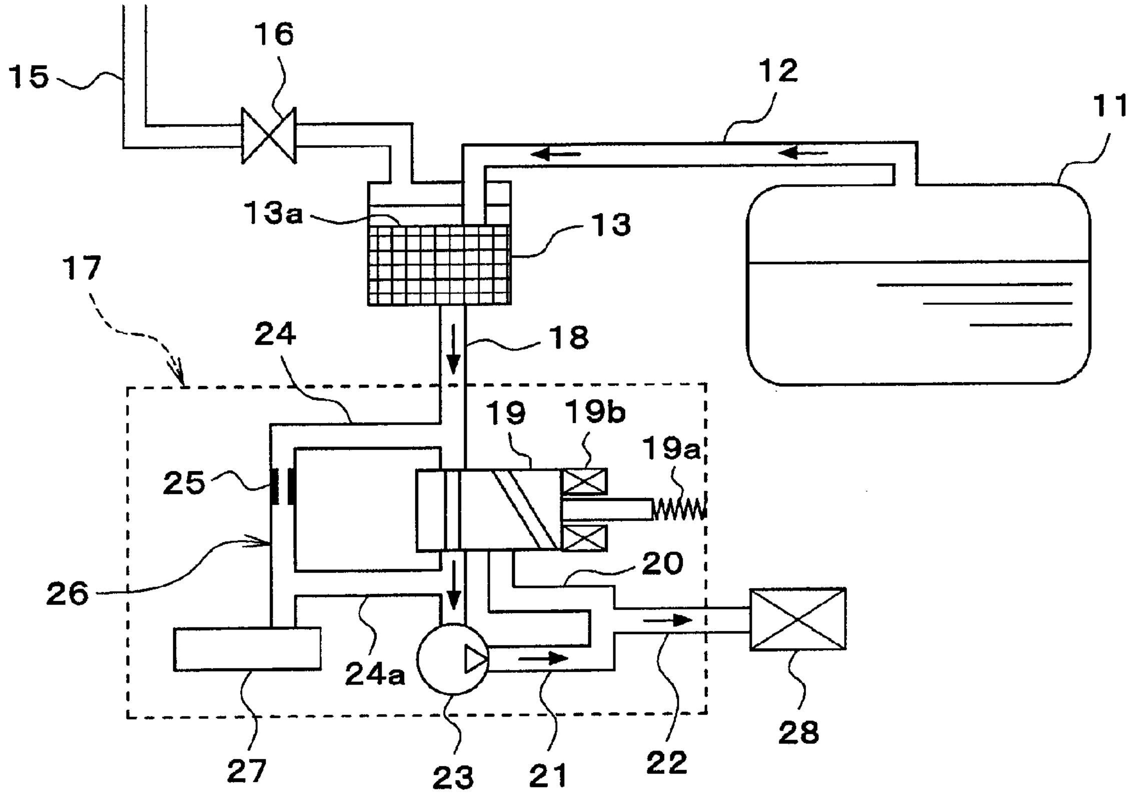
FIG. 3 is a schematic diagram showing an outline of the leakage-checking module indicating an evaporation-system pressure detecting state, according to the first embodiment.

The passage-switching valve 19 is an electromagnetic valve that is switchable between an atmosphere position and a pump-pressure position. At the atmosphere position, the canister communication passage 18 is connected with the atmosphere introducing passage 20 as shown in FIGS. 1 and 2. At the pump-pressure position, the canister communication passage 18 is connected with the pump-pressure introducing passage 21 as shown in FIG. 3. The passage-switching valve 19 has a biasing portion 19*a* and a solenoid 19*b*. For example, the biasing portion 19*a* may be a spring. When the passage-switching valve 19 is deenergized, the passage-switching valve 19 is held to the atmosphere position by the biasing portion 19*a*. When the passage-switching valve 19 is energized, the passage-switching valve 19 is held to the pump-pressure position by an electromagnetic driving force of the solenoid 19*b*.

A bypass passage 24 is provided between the canister communication passage 18 and the pump-pressure introducing passage 21 to bypass the passage-switching valve 19. The bypass passage 24 is provided with a reference orifice 25 that corresponds to a reference hole. The reference orifice 25 has an inner diameter less than that of other parts of the bypass passage 24. The inner diameter of the reference orifice 25 is referred to as a reference leakage diameter, for example, may be 0.5 mm. The bypass passage 24 has an orifice passage 24*a* that is connected with the reference orifice 25 and the pump-pressure introducing passage 21. The reference orifice 25 and the orifice passage 24*a* define a reference-pressure detecting portion 26. The reference-pressure detecting portion 26 is provided with a pressure sensor 27. According to the present embodiment, the pressure sensor 27 is a pressure detecting portion.

As shown in FIG. 1, when the leakage-checking module 17 is operating in a normal state, the negative-pressure pump 23 is turned off, and the passage-switching valve 19 is switched to the atmosphere position. Therefore, the bypass passage 24 is connected with the atmosphere via the atmosphere introducing passage 20 and the atmosphere communication passage 22. In this case, the atmospheric pressure can be detected by detecting a pressure Pte in the reference-pressure detecting portion 26 according to the pressure sensor 27.

As shown in FIG. 2, when the leakage-checking module 17 is operating in a reference-pressure detecting state, the purge valve 16 is closed, the passage-switching valve 19 is switched to the atmosphere position, and the negative-pressure pump 23 is turned on. Therefore, a flow along arrows shown in FIG. 2 is generated, and a negative pressure is generated in the reference-pressure detecting portion 26 according to the reference orifice 25. In this case, since the pressure Pte in the reference-pressure detecting portion 26 is detected by the pressure sensor 27, a reference pressure P2 correlative to the reference leakage diameter can be detected. According to the present embodiment, the pressure Pte in the reference-pressure detecting portion 26 may be used as the reference pressure P2.

As shown in FIG. 3, when the leakage-checking module 17 is operating in an evaporation-system pressure detecting state, the purge valve 16 is closed, and the passage-switching valve 19 is switched to the pump-pressure position. Therefore, the evaporation system is sealed, and the reference-pressure detecting portion 26 is connected with the evaporation system via the pump-pressure introducing passage 21 and the canister communication passage 18. In this case, since the pressure in the reference-pressure detecting portion 26 is detected by the pressure sensor 27, a pressure in the evaporation system can be detected. Further, when the negative-pressure pump 23 is turned on, a flow along arrows shown in FIG. 3 is generated, the gas in the evaporation system is discharged to the atmosphere via the canister 13, and the negative pressure is introduced into the evaporation system.

As shown in FIG. 1, outputs of the above various sensors including the pressure sensor 27 are transmitted to an electronic control unit (ECU) 29. The ECU 29 is constructed by a microcomputer having a storage media storing various programs for controlling the engine. For example, the storage media may be a ROM. The ECU 29 executes the programs according to an operating state of the engine to control a fuel injection amount, an ignition time point, a throttle opening degree, or an intake-air amount, and executes a purge control to control the purging flow-volume by controlling the purge valve 16.

However, in the evaporated-gas purge system, it is possible that a fixed open abnormality that the purge valve 16 is fixed to be slightly open (in a non-fully closed state) is generated other than a leakage abnormality that the evaporated gas is leaked from a leakage hole to the atmosphere and a fixed closed abnormality that the purge valve 16 is fixed to be closed.

When the fixed open abnormality of the purge valve 16 cannot be detected, a fixed opening degree that is an opening degree of the purge valve 16 being fixed may lead to following matters.

When the fixed opening degree of the purge valve 16 is relatively small, it is possible that a leakage abnormality is erroneously detected and a component exchange of the evaporated-gas purge system that is not necessary is executed. According to the present embodiment, the component exchange includes an exchange of the leakage-checking module 17.

When the fixed opening degree of the purge valve 16 is relatively large, it is possible that a malfunction of the leakage-checking module 17 is generated due to a deterioration of an engine performance, a deterioration of an emission of the engine, or an entering of foreign matters or water.

It is unknown whether an idle rotation speed control (ISC) abnormality or fuel system abnormality can be detected in an operating state of the engine according to the fixed opening degree of the purge valve 16. Even though the above abnormalities can be detected, it cannot be specified that the above abnormalities are generated due to a fixed state of the purge valve 16.

According to the first embodiment, the ECU 29 executes an abnormality diagnosis routine to execute the leakage abnormality diagnosis which determines whether a leakage abnormality of the evaporation system is generated in a stop of the engine and a purge-valve abnormality diagnosis which determines whether an abnormality of the purge valve 16 is generated. In this case, the abnormality of the purge valve 16 includes a fixed open abnormality and a fixed closed abnormality.

The ECU 29 executes a reference-pressure detecting operation in which the negative pressure is introduced into the reference-pressure detecting portion 26 by the negative-pressure pump 23 so as to detect the reference pressure P2 correlative to the reference orifice 25. Then, the ECU 29 executes a first evaporation-system pressure detecting operation to detect a pressure in the evaporation system of when a pressure is introduced into the evaporation system by the negative-pressure pump 23 after the purge valve 16 is controlled to be closed. In this case, the pressure in the evaporation system is referred to as a purge-valve closed pressure P3. Then, the ECU 29 executes a second evaporation-system pressure detecting operation to detect the pressure in the evaporation system of when the pressure is introduced into the evaporation system by the negative-pressure pump 23 after the purge valve 16 is controlled to be open. In this case, the pressure in the evaporation system is referred to as a purge-valve open pressure P4. Then, the ECU 29 determines whether the leakage abnormality of the evaporation system, the fixed open abnormality of the purge valve 16, or the fixed closed abnormality of the purge valve 16, based on a magnitude relation between the reference pressure P2, the purge-valve closed pressure P3, and the purge-valve open pressure P4.

When the evaporated-gas purge system is normal and the leakage abnormality of the evaporation system is generated and the fixed closed abnormality of the purge valve 16 is generated and the fixed open abnormality of the purge valve 16 is generated, the magnitude relation between the reference pressure P2, the purge-valve closed pressure P3, and the purge-valve open pressure P4 differs. Therefore, when the magnitude relation between the reference pressure P2, the purge-valve closed pressure P3, and the purge-valve open pressure P4 is estimated, the leakage abnormality of the evaporation system, the fixed open abnormality of the purge valve 16, and the fixed closed abnormality of the purge valve 16 can be determined.

Figure 4:
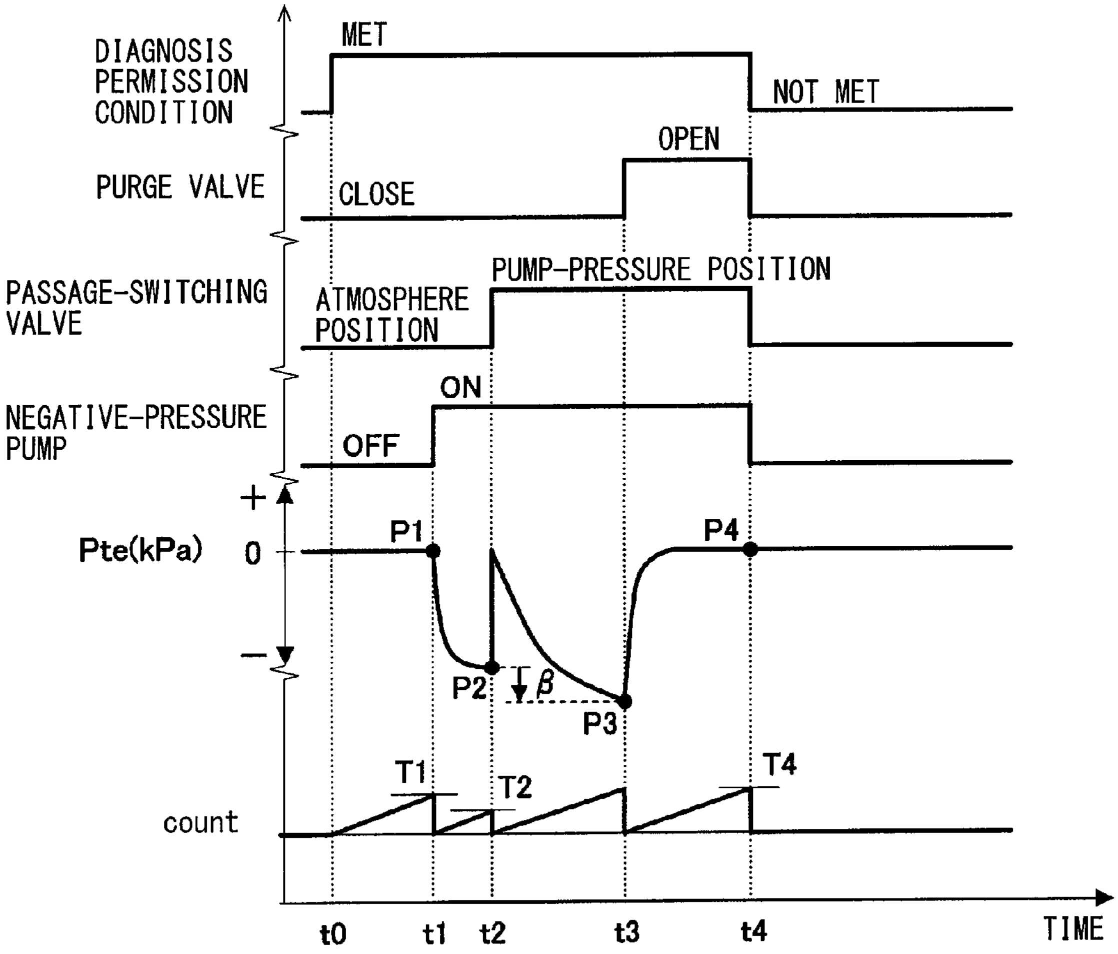
FIG. 4 is a time chart showing a detected pressure of when the evaporated-gas purge system is normal, according to the first embodiment.

As shown in FIG. 4, the ECU 29 determines whether a diagnosis permission condition is met at a time point t0 that a predetermined time period has elapsed after the engine is stopped. For example, the predetermined time period may be 3 to 5 hours. When the engine is stopped, the purge valve 16 is held to be in a closed state, the passage-switching valve 19 is held to the atmosphere position, and the negative-pressure pump 23 is held to be turned off.

At a time point t1 that a first predetermined period T1 has elapsed since the diagnosis permission condition is met, the ECU 29 detects the pressure Pte in the reference-pressure detecting portion 26 by utilizing the pressure sensor 27 as the atmospheric pressure P1.

The ECU 29 starts the reference-pressure detecting operation after detecting the atmospheric pressure P1. In the reference-pressure detecting operation, the purge valve 16 is maintained to be closed (in the closed state), the passage-switching valve 19 is held to the atmosphere position, the negative-pressure pump 23 is turned on, and the negative pressure is introduced into the reference-pressure detecting portion 26. The ECU 29 determines that the negative pressure in the reference-pressure detecting portion 26 stabilizes in the vicinity of the reference pressure P2 correlative to the reference orifice 25, and detects the pressure Pte in the reference-pressure detecting portion 26 by utilizing the pressure sensor 27 as the reference pressure P2 at a time point t2 that a second predetermined period T2 has elapsed after the negative pressure starts to be introduced into the reference-pressure detecting portion 26. In this case, the time point t2 may be a time point that the pressure in the reference-pressure detecting portion 26 becomes stable.

The ECU 29 starts the first evaporation-system pressure detecting operation after detecting the reference pressure P2. In the first evaporation-system pressure detecting operation, the purge valve 16 is held to be closed, the negative-pressure pump 23 is held to be turned on, the passage-switching valve 19 is switched to the pump-pressure position, and the negative pressure is introduced into the evaporation system according to the negative-pressure pump 23. In this case, when the evaporated-gas purge system is normal as shown in FIG. 4, the pressure in the evaporation system is lower than the reference pressure P2 in a short time. The ECU 29 detects the pressure Pte in the evaporation system by utilizing the pressure sensor 27 as the purge-valve closed pressure P3 at a time point t3 that the pressure Pte in the evaporation system detected by the pressure sensor 27 becomes equal to a lower determination pressure (P2−β). In this case, the lower determination pressure is a pressure lower than the reference pressure P2 by a predetermined pressure 13, and the time point t3 may be a time point that a third predetermined period T3 has elapsed after the negative pressure starts to be introduced into the evaporation system.

The ECU 29 starts the second evaporation-system pressure detecting operation after detecting the purge-valve closed pressure P3. In the second evaporation-system pressure detecting operation, the passage-switching valve 19 is held to the pump-pressure position, the negative-pressure pump 23 is held to be turned on, and the purge valve 16 is switched to be open (an open state). In this case, when the evaporated-gas purge system is normal as shown in FIG. 4, the pressure in the evaporation system is increased to be in the vicinity of the atmospheric pressure in a short time. For example, the pressure in the evaporation system is increased to be in the vicinity of 0 kPa. The ECU 29 detects the pressure Pte in the evaporation system by utilizing the pressure sensor 27 as the purge-valve open pressure P4 at a time point t4 that a fourth predetermined period T4 has elapsed after the purge valve 16 is switched to the open state.

As shown in FIG. 4, when the evaporated-gas purge system is normal, the purge-valve closed pressure P3 is lower than the reference pressure P2 (P2>P3). Further, the purge-valve open pressure P4 is higher than the purge-valve closed pressure P3 (P3<P4).

Figure 5:
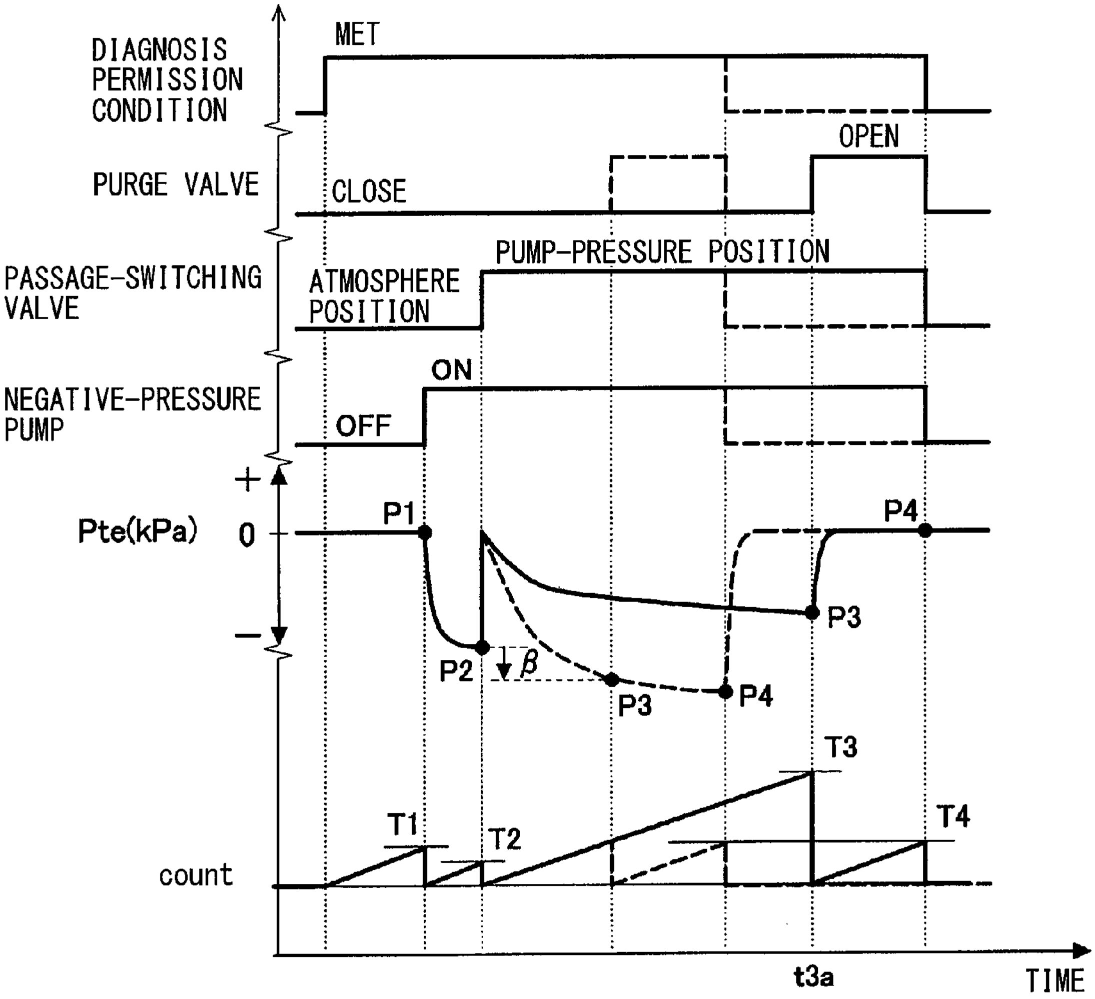
FIG. 5 is a time chart showing the detected pressure of when a leakage abnormality or a fixed closed abnormality of a purge valve is generated, according to the first embodiment.

As a solid line shown in FIG. 5, the leakage abnormality of the evaporation system is generated, that is, the leakage hole having a diameter greater than the reference leakage diameter is generated. In this case, when the ECU 29 executes the first evaporation-system pressure detecting operation, the atmosphere is introduced from the leakage hole even though the negative pressure is introduced into the evaporation system. Therefore, a decreasing rate of the pressure in the evaporation system becomes slow, and the pressure in the evaporation system is not decreased to the reference pressure P2. Thus, the ECU 29 detects the pressure Pte in the evaporation system by utilizing the pressure sensor 27 as the purge-valve closed pressure P3 at a time point t3*a* that the third predetermined period T3 has elapsed after the negative pressure starts to be introduced into the evaporation system, and the purge-valve closed pressure P3 is higher than the reference pressure P2 (P2<P3). Then, when the ECU 29 executes the second evaporation-system pressure detecting operation and the purge valve 16 is switched to the open state, the pressure in the evaporation system is increased to be in the vicinity of the atmospheric pressure. Therefore, the purge-valve open pressure P4 is higher than the purge-valve closed pressure P3 (P3<P4).

As a dashed line shown in FIG. 5, the fixed closed abnormality of the purge valve 16 is generated. In this case, when the ECU 29 executes the first evaporation-system pressure detecting operation and the negative pressure is introduced into the evaporation system, the pressure in the evaporation system is lower than the reference pressure P2 in a short time as the same as the pressure of when the evaporated-gas purge system is normal as shown in FIG. 4. Therefore, the purge-valve closed pressure P3 is lower than the reference pressure P2 (P2>P3). Then, when the ECU 29 executes the second evaporation-system pressure detecting operation, the purge valve 16 is fixed to the closed state even though the purge valve 16 is controlled to be switched to the open state. Therefore, the pressure in the evaporation system is continuously decreased. In other words, the pressure in the evaporation system is not increased. Thus, the purge-valve open pressure P4 is lower than the purge-valve closed pressure P3 (P3>P4).

Figure 6:
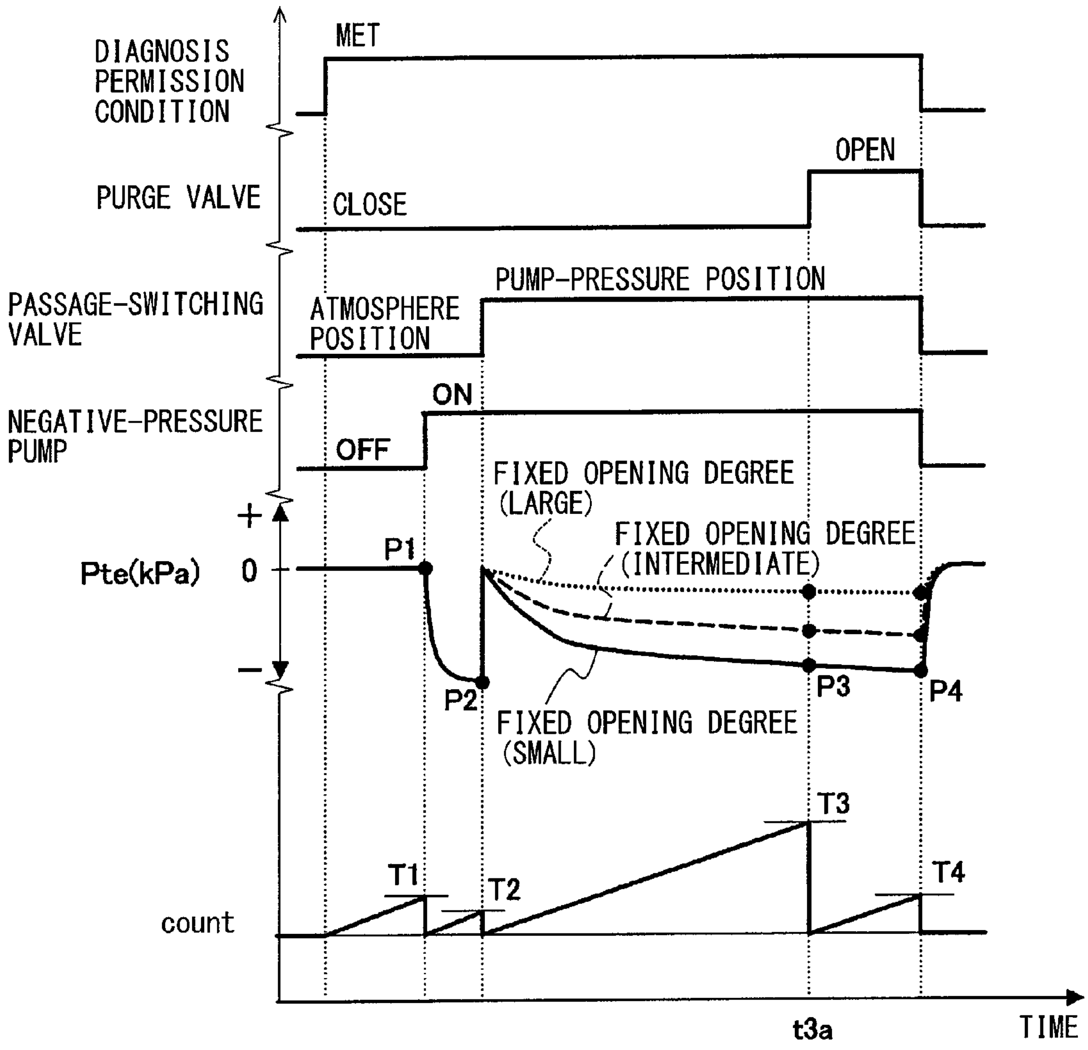
FIG. 6 is a time chart showing the detected pressure of when a fixed open abnormality of the purge valve is generated, according to the first embodiment.

As shown in FIG. 6, the fixed open abnormality of the purge valve 16 is generated. In this case, when the ECU 29 executes the first evaporation-system pressure detecting operation, even though the negative pressure is introduced into the evaporation system, the purge valve 16 is fixed to the open state and the atmosphere is introduced from the purge valve 16. Therefore, the decreasing rate of the pressure in the evaporation system becomes slow, and the pressure in the evaporation system is not decreased to the reference pressure P2. Thus, the ECU 29 detects the pressure Pte in the evaporation system by utilizing the pressure sensor 27 as the purge-valve closed pressure P3 at a time point t3*a* that the third predetermined period T3 has elapsed after the negative pressure starts to be introduced into the evaporation system, and the purge-valve closed pressure P3 is higher than the reference pressure P2 (P2<P3). Then, when the ECU 29 executes the second evaporation-system pressure detecting operation, the purge valve 16 is fixed to the open state even though the purge valve 16 is controlled to be switched to the open state. Therefore, the pressure in the evaporation system is continuously decreased. In other words, the pressure in the evaporation system is not increased. Thus, the purge-valve open pressure P4 is lower than the purge-valve closed pressure P3 (P3>P4).

As the above description, considering a magnitude relation between the reference pressure P2 and the purge-valve closed pressure P3 and a magnitude relation between the purge-valve closed pressure P3 and the purge-valve open pressure P4, an abnormality state can determined as followings.

(1) When the purge-valve closed pressure P3 is lower than or equal to the reference pressure P2 and the purge-valve open pressure P4 is higher than the purge-valve closed pressure P3 (P2≤P3 and P3<P4) as shown in FIG. 4, the ECU 29 determines that the evaporated-gas purge system is normal.

(2) When the purge-valve closed pressure P3 is higher than the reference pressure P2 and the purge-valve open pressure P4 is higher than the purge-valve closed pressure P3 (P2<P3 and P3<P4) as the solid line shown in FIG. 5, the ECU 29 determines that the leakage abnormality of the evaporation system is generated.

(3) When the purge-valve closed pressure P3 is lower than or equal to the reference pressure P2 and the purge-valve open pressure P4 is lower than or equal to the purge-valve closed pressure P3 (P2≥P3 and P3≥P4) as the dashed line shown in FIG. 5, the ECU 29 determines that the fixed closed abnormality of the purge valve 16 is generated.

(4) When the purge-valve closed pressure P3 is higher than the reference pressure P2 and the purge-valve open pressure P4 is lower than or equal to the purge-valve closed pressure P3 (P2<P3 and P3≥P4) as shown in FIG. 6, the ECU 29 determines that the fixed open abnormality of the purge valve 16 is generated.

According to the present embodiment, when the ECU 29 determines that the fixed open abnormality of the purge valve 16 is generated, the ECU 29 compares the atmospheric pressure P1 with the purge-valve open pressure P4 to estimate the fixed opening degree of the purge valve 16. When the fixed open abnormality of the purge valve 16 is generated, a relationship between the atmospheric pressure P1 and the purge-valve open pressure P4 differs according to the fixed opening degree of the purge valve 16. Therefore, the fixed opening degree of the purge valve 16 can be estimated by comparing the atmospheric pressure P1 with the purge-valve open pressure P4. Thus, when the fixed open abnormality of the purge valve 16 is generated, the fixed opening degree of the purge valve 16 can be specified.

When the fixed open abnormality of the purge valve 16 is generated as shown in FIG. 6, since the purge-valve open pressure P4 decreases in accordance with a decrease in fixed opening degree of the purge valve 16, a first difference between the purge-valve open pressure P4 and the atmospheric pressure P1 increases in accordance with a decrease in fixed opening degree of the purge valve 16. Therefore, the ECU 29 determines that the fixed opening degree of the purge valve 16 decreases in accordance with an increase in first difference between the purge-valve open pressure P4 and the atmospheric pressure P1. In other words, the ECU 29 determines that the fixed opening degree of the purge valve 16 increases in accordance with a decrease in first difference between the purge-valve open pressure P4 and the atmospheric pressure P1. Thus, the fixed opening degree of the purge valve 16 can be accurately estimated.

Figure 7:
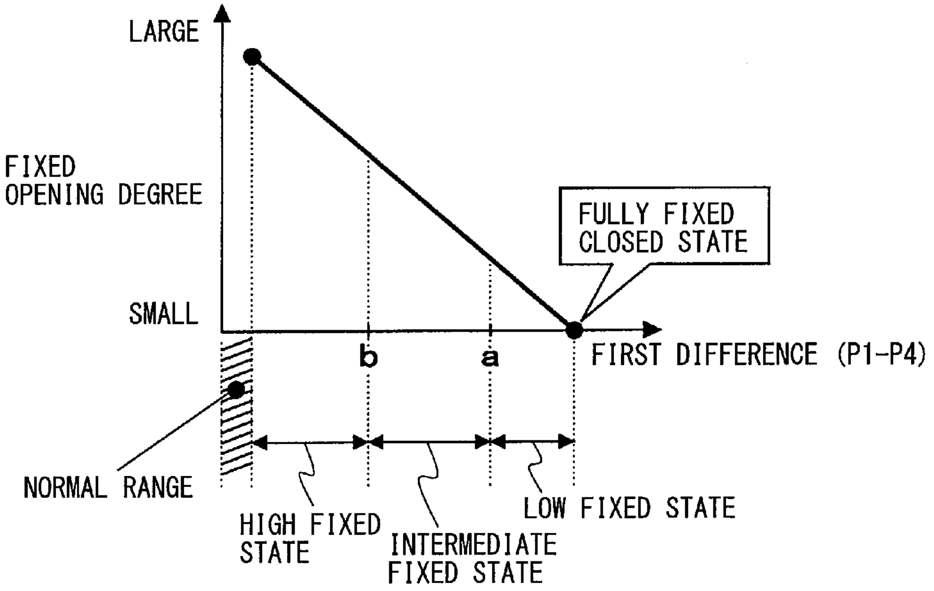
FIG. 7 is a graph showing a relationship between a first difference (P1−P4) and a fixed opening degree of the purge valve, according to the first embodiment.

Specifically, a value obtained by subtracting the purge-valve open pressure P4 from the atmospheric pressure P1 is calculated as the first difference between the purge-valve open pressure P4 and the atmospheric pressure P1. Then, as shown in FIG. 7, the ECU 29 compares the first difference (P1−P4) with a first determination threshold a and a second determination threshold b. According to the present embodiment, the first determination threshold a is greater than the second determination threshold b. When the ECU 29 determines that the first difference (P1−P4) is greater than the first determination threshold a, the ECU 29 determines a low fixed state of the purge valve 16 in which the fixed opening degree of the purge valve 16 is in a lower level. When the ECU 29 determines that the first difference (P1−P4) is less than or equal to the first determination threshold a and the first difference (P1−P4) is greater than the second determination threshold b, the ECU 29 determines an intermediate fixed state of the purge valve 16 in which the fixed opening degree of the purge valve 16 is in an intermediate level. When the ECU 29 determines that the first difference (P1−P4) is less than or equal to the second determination threshold b, the ECU 29 determines a high fixed state of the purge valve 16 in which the fixed opening degree of the purge valve 16 is in a higher level.

Hereafter, referring to FIGS. 8 and 9, the abnormality diagnosis routine executed by the ECU 29 according to the first embodiment will be described.

Figure 8:
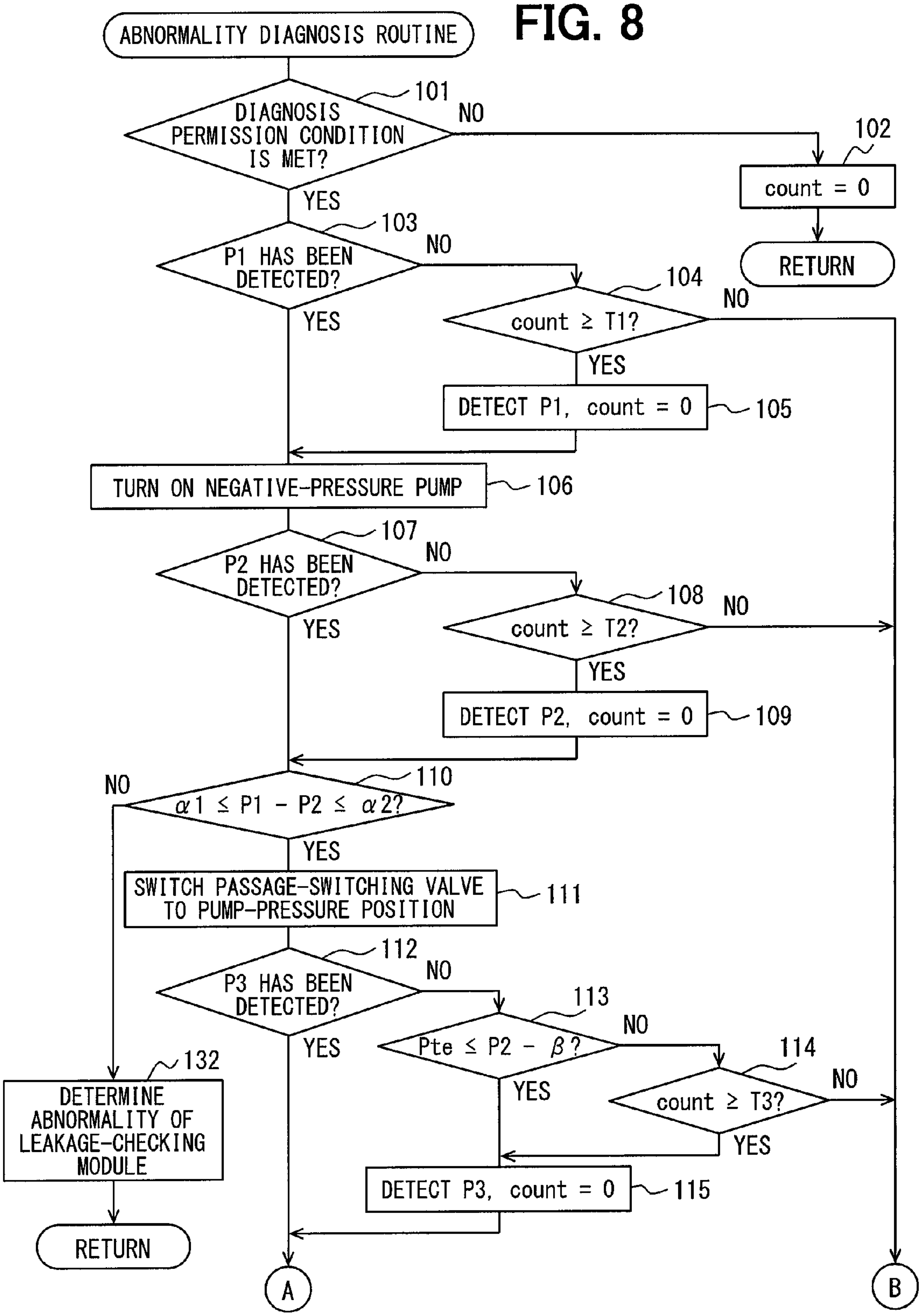
FIG. 8 is a flowchart showing a part of an abnormality diagnosis routine according to the first embodiment.
Figure 9:
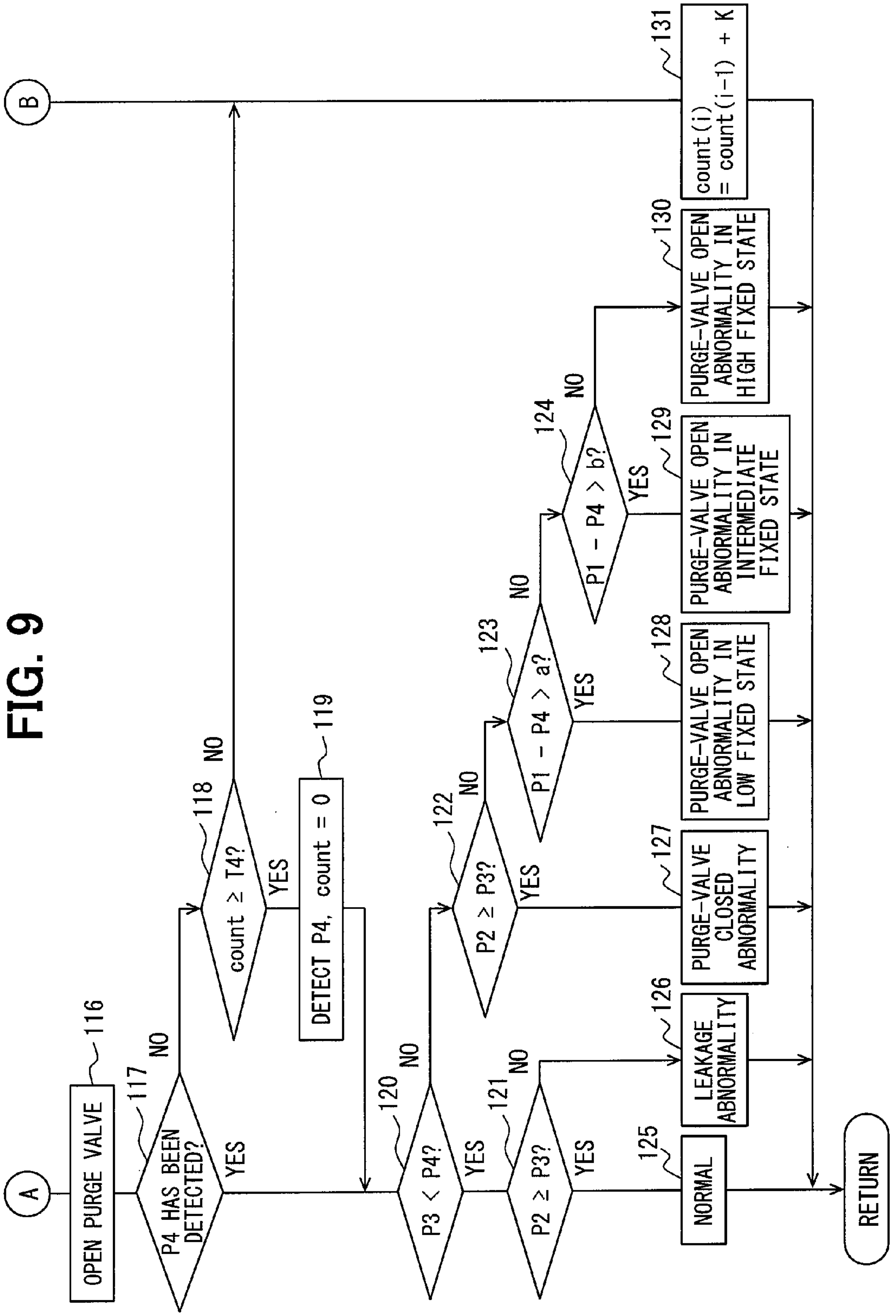
FIG. 9 is a flowchart showing another part of the abnormality diagnosis routine according to the first embodiment.

As shown in FIGS. 8 and 9, the abnormality diagnosis routine is an abnormality diagnosis portion, and is executed at a predetermined calculation period in a case where the predetermined time period has elapsed by utilizing a timer after the engine is stopped. According to the present embodiment, the predetermined time period may be 3 to 5 hours.

At 101, the ECU 29 determines whether the diagnosis permission condition is met. For example, the ECU 29 determines whether a temperature condition of the coolant temperature or an intake-air temperature, an atmosphere pressure condition, or a condition of an engine operating state before an ignition switch (IG switch) is turned off, is met.

When the ECU 29 determines that the diagnosis permission condition is not met at 101, the ECU 29 proceeds to 102. At 102, the ECU 29 resets a count value Count of a measurement counter to an initial value and terminates the present routine. According to the present embodiment, the initial value is zero.

When the ECU 29 determines that the diagnosis permission condition is met at 101, the ECU 29 proceeds to 103. At 103, the ECU 29 determines whether the atmospheric pressure P1 has been detected.

When the ECU 29 determines that the atmospheric pressure P1 has not been detected at 103, the ECU 29 proceeds to 104. At 104, the ECU 29 determines whether the count value Count has reached the first predetermined period T1. In other words, the ECU 29 determines whether the first predetermined period T1 has elapsed after the diagnosis permission condition is met. The first predetermined period T1 is used as a warming-up waiting time of the pressure sensor 27, and is set to be 1 to 2 minutes.

When the ECU 29 determines that the count value Count has not reached the first predetermined period T1 at 104, the ECU 29 proceeds to 131 as shown in FIG. 9. At 131, the ECU 29 counts up the count value Count by a predetermined value K. The predetermined value K is set to be equal to the calculation period of the present routine. Specifically, when the calculation period of the present routine is 50 ms, the predetermined value K is set to be 50 ms. When the calculation period of the present routine is 100 ms, the predetermined value K is set to be 100 ms.

When the ECU 29 determines that the count value Count has reached the first predetermined period T1 at 104, the ECU 29 proceeds to 105. At 105, the ECU 29 detects the pressure Pte in the reference-pressure detecting portion 26 by utilizing the pressure sensor 27 as the atmospheric pressure P1 and stores the atmospheric pressure P1, and resets the count value Count to the initial value. Then, the ECU 29 executes the reference-pressure detecting operation from 106 to 109.

When the ECU 29 determines that the atmospheric pressure P1 has been detected at 103, the ECU 29 executes the reference-pressure detecting operation from 106 to 109, without executing operations in 104 and 105.

In the reference-pressure detecting operation, at 106, the ECU 29 maintains the closed state of the purge valve 16, maintains the passage-switching valve 19 to the atmosphere position, turns on the negative-pressure pump 23, and introduces the negative pressure into the reference-pressure detecting portion 26.

At 107, the ECU 29 determines whether the reference pressure P2 has been detected. When the ECU 29 determines that the reference pressure P2 has not been detected at 107, the ECU 29 proceeds to 108. At 108, the ECU 29 determines whether the count value Count has reached the second predetermined period T2. In other words, the ECU 29 determines whether the second predetermined period T2 has elapsed after the negative pressure starts to be introduced into the reference-pressure detecting portion 26. The second predetermined period T2 is a warming-up waiting time of the negative-pressure pump 23, and is set to be 5 to 6 minutes.

When the ECU 29 determines that the count value Count has not reached the second predetermined period T2 at 108, the ECU 29 proceeds to 131 shown in FIG. 9. At 131, the ECU 29 counts up the count value Count by the predetermined value K.

When the ECU 29 determines that the count value Count has reached the second predetermined period T2 at 108, the ECU 29 proceeds to 109. At 109, the ECU 29 detects the pressure Pte in the reference-pressure detecting portion 26 by utilizing the pressure sensor 27 as the reference pressure P2 and stores the reference pressure P2, resets the count value Count to the initial value, and proceeds to 110.

When the ECU 29 determines that the reference pressure P2 has been detected at 107, the ECU 29 directly proceeds to 110 without executing operations in 108 and 109.

At 110, the ECU 29 determines a relationship between the atmospheric pressure P1 and the reference pressure P2. When a malfunction of the leakage-checking module 17, which includes a non-operation malfunction of the negative-pressure pump 23, a flow-rate malfunction of the negative-pressure pump 23, and a malfunction in the reference leakage diameter of the reference orifice 25, is generated, the leakage abnormality diagnosis and the purge-valve abnormality diagnosis cannot be precisely executed. Therefore, at 110, the ECU 29 determines whether a second difference (P1−P2) between the atmospheric pressure P1 and the reference pressure P2 is in a normal range.

Specifically, the ECU 29 determines whether the second difference (P1−P2) is no less than a lower limit α1 and is no greater than an upper limit α2. According to the present embodiment, the second difference (P1−P2) is a value obtained by subtracting the reference pressure P2 from the atmospheric pressure P1. The lower limit α1 of the normal range is set according to a reference pressure value detected in a case where a flow volume of the negative-pressure pump 23 is a lower standard limit and the reference leakage diameter of the reference orifice 25 is an upper standard limit. In this case, it is most difficult that the negative pressure is generated. The upper limit α2 of the normal range is set according to the reference pressure value detected in a case where the flow volume of the negative-pressure pump 23 is an upper standard limit and the reference leakage diameter of the reference orifice 25 is a lower standard limit. In this case, it is most easy that the negative pressure is generated.

When the ECU 29 determines that the second difference (P1−P2) is out of the normal range at 110, the ECU 29 proceeds to 132. Specifically, when the ECU 29 determines that the second difference (P1−P2) is less than the lower limit α1 or is greater than the upper limit α2, the ECU 29 proceeds to 132. At 132, the ECU 29 determines that an abnormality of the leakage-checking module 17 is generated and terminates the present routine. When the ECU 29 determines that the second difference (P1−P2) is out of the normal range, the ECU 29 turns off the negative-pressure pump 23, switches the passage-switching valve 19 to the atmosphere position, switches the purge valve 16 to the closed state, and terminates the abnormality diagnosis routine. In this case, the ECU 29 changes the diagnosis permission condition to be not met.

When the ECU 29 determines that the second difference (P1−P2) is in the normal range at 110, the ECU 29 executes the first evaporation-system pressure detecting operation from 111 to 115.

In the first evaporation-system pressure detecting operation, at 111, the ECU 29 maintains the purge valve 16 to the closed state, maintains the negative-pressure pump 23 to be turned on, switches the passage-switching valve 19 to the pump-pressure position, and introduces the negative pressure into the evaporation system by utilizing the negative-pressure pump 23.

At 112, the ECU 29 determines whether the purge-valve closed pressure P3 has been detected. When the ECU 29 determines that the purge-valve closed pressure P3 has not been detected at 112, the ECU 29 proceeds to 113. At 113, the ECU 29 determines whether the pressure Pte in the evaporation system detected by the pressure sensor 27 is lower than or equal to the lower determination pressure (P2−β).

When the ECU 29 determines that the pressure Pte in the evaporation system is higher than the lower determination pressure (P2−β) at 113, the ECU 29 proceeds to 114. At 114, the ECU 29 determines whether the count value Count has reached the third predetermined period T3. In other words, the ECU 29 determines whether the third predetermined period T3 has elapsed after the negative pressure is introduced into the evaporation system. The third predetermined period T3 is set to a value no less than a decompression time that is longest of when the evaporated-gas purge system is normal. The decompression time is a time necessary for the pressure in the evaporation system to be decompressed to the lower determination pressure by a combination of system components including a capacity of a fuel tank or a capacity of a pipe.

When the ECU 29 determines that the count value Count has not reached the third predetermined period T3 at 114, the ECU 29 proceeds to 131 as shown in FIG. 9. At 131, the ECU 29 counts up the count value Count by the predetermined value K.

When the ECU 29 determines that the pressure Pte in the evaporation system is lower than or equal to the lower determination pressure (P2−β) at 113 or the count value Count has reached the third predetermined period T3 at 114, the ECU 29 proceeds to 115. At 115, the ECU 29 detects the pressure Pte in the evaporation system by utilizing the pressure sensor 27 as the purge-valve closed pressure P3 and stores the purge-valve closed pressure P3, and resets the count value Count to the initial value. Then, the ECU 29 executes the second evaporation-system pressure detecting operation from 116 to 119.

When the ECU 29 determines that the purge-valve closed pressure P3 has been detected at 112, the ECU 29 executes the second evaporation-system pressure detecting portion from 116 to 119, without executing operations in 113 to 115.

In the second evaporation-system pressure detecting operation, at 116, the ECU 29 maintains the passage-switching valve 19 to the pump-pressure position, maintains the negative-pressure pump 23 to be turned on, and switches the purge valve 16 to the open state.

At 117, the ECU 29 determines whether the purge-valve open pressure P4 has been detected. When the ECU 29 determines that the purge-valve open pressure P4 has not been detected at 117, the ECU 29 proceeds to 118. At 118, the ECU 29 determines whether the count value Count has reached the fourth predetermined period 14. In other words, the ECU 29 determines whether the fourth predetermined period T4 has elapsed after the purge valve 16 is switched to the open state. The fourth predetermined period T4 is a time that is sufficient for the pressure in the evaporation system to be returned to the atmospheric pressure, and is set to be 1 to 2 minutes.

When the ECU 29 determines that the count value Count has not reached the fourth predetermined period T4 at 118, the ECU 29 proceeds to 131. At 131, the ECU 29 counts up the count value Count by the predetermined value K.

When the ECU 29 determines that the count value Count has reached the fourth predetermined period T4 at 118, the ECU 29 proceeds to 119. At 119, the ECU 29 detects the pressure Pte in the evaporation system by utilizing the pressure sensor 27 as the purge-valve open pressure P4 and stores the purge-valve open pressure P4, and resets the count value Count to the initial value. Then, the ECU 29 executes the abnormality diagnosis operation from 120 to 130.

When the ECU 29 determines that the purge-valve open pressure P4 has been detected at 117, the ECU 29 executes the abnormality diagnosis operation from 120 to 130, without executing operations in 118 and 119.

In the abnormality diagnosis operation, at 120, the ECU 29 determines whether the purge-valve open pressure P4 is higher than the purge-valve closed pressure P3 (P3<P4). In other words, the ECU 29 determines whether the pressure in the evaporation system is increased when the purge valve 16 is switched to the open state.

When the ECU 29 determines that the purge-valve open pressure P4 is higher than the purge-valve closed pressure P3 (P3<P4) at 120, the ECU 29 determines that the purge valve 16 is normal and proceeds to 121. At 121, the ECU 29 determines whether the purge-valve closed pressure P3 is lower than or equal to the reference pressure P2 (P2 P3).

When the ECU 29 determines that the purge-valve closed pressure P3 is lower than or equal to the reference pressure P2 at 121, the ECU 29 determines that the evaporation system is normal and proceeds to 125. In this case, specifically, the ECU 29 determines that no leakage hole having a diameter greater than the reference leakage diameter exists. At 125, the ECU 29 determines that the evaporated-gas purge system is normal and terminates the present routine.

When the ECU 29 determines that the purge-valve closed pressure P3 is higher than the reference pressure P2 (P2<P3) at 121, the ECU 29 proceeds to 126. At 126, the ECU 29 determines that the leakage abnormality of the evaporation system is generated and terminates the present routine. In this case, specifically, the ECU 29 determines that the leakage hole having a diameter greater than the reference leakage diameter exists.

When the ECU 29 determines that the purge-valve open pressure P4 is lower than or equal to the purge-valve closed pressure P3 (P3≥P4) at 120, the ECU 29 determines that the abnormality of the purge valve 16 is generated and proceeds to 122. In other words, when the ECU 29 determines that the pressure in the evaporation system is not increased, the ECU 29 determines that the abnormality of the purge valve 16 is generated and proceeds to 122. At 122, the ECU 29 determines whether the purge-valve closed pressure P3 is lower than or equal to the reference pressure P2 (P2≥P3).

When the ECU 29 determines that the purge-valve closed pressure P3 is lower than or equal to the reference pressure P2 at 122, the ECU 29 determines that the purge valve 16 is fixed to the closed state and proceeds to 127. At 127, the ECU 29 determines that the fixed closed abnormality of the purge valve 16 is generated and terminates the present routine.

When the ECU 29 determines that the purge-valve closed pressure P3 is higher than the reference pressure P2 (P2<P3) at 122, the ECU 29 determines that the purge valve 16 is fixed to the open state and proceeds to 123. At 123, the ECU 29 determines whether the first difference (P1−P4) is greater than the first determination threshold a (P1−P4>a).

When the ECU 29 determines that the first difference (P1−P4) is greater than the first determination threshold a at 123, the ECU 29 proceeds to 128. At 128, the ECU 29 determines that the fixed open abnormality of the purge valve 16 is in the low fixed state of the purge valve 16 and terminates the present routine.

When the ECU 29 determines that the first difference (P1−P4) is less than or equal to the first determination threshold a (P1−P4≤a) at 123, the ECU 29 proceeds to 124.

At 124, the ECU 29 determines whether the first difference (P1−P4) is greater than the second determination threshold b (P1−P4>b).

When the ECU 29 determines that the first difference (P1−P4) is greater than the second determination threshold b at 124, the ECU 29 proceeds to 129. At 129, the ECU 29 determines that the fixed open abnormality of the purge valve 16 is in the intermediate fixed state of the purge valve 16 and the ECU 29 terminates the present routine.

When the ECU 29 determines that the first difference (P1−P4) is less than or equal to the second determination threshold b (P1−P4≤b) at 124, the ECU 29 proceeds to 130. At 130, the ECU 29 determines that the fixed open abnormality of the purge valve 16 is in the high fixed state of the purge valve 16 and the ECU 29 terminates the present routine.

Further, the ECU 29 turns off the negative-pressure pump 23, switches the passage-switching valve 19 to the atmosphere position, switches the purge valve 16 to the closed state, and terminates the abnormality diagnosis, after the ECU 29 executes one of operations in 125 to 130. In this case, the ECU 29 makes the diagnosis permission condition to be not met.

According to the first embodiment, the reference pressure P2, the purge-valve closed pressure P3, and the purge-valve open pressure P4 are detected. As the above description, when the evaporated-gas purge system is normal and the leakage abnormality of the evaporation system is generated and the fixed closed abnormality of the purge valve 16 is generated and the fixed open abnormality of the purge valve 16 is generated, the magnitude relation between the reference pressure P2, the purge-valve closed pressure P3, and the purge-valve open pressure P4 differs. Therefore, the leakage abnormality of the evaporation system, the fixed open abnormality of the purge valve 16, and the fixed closed abnormality of the purge valve 16 are determined by comparing the purge-valve closed pressure P3 with the reference pressure P2 and the purge-valve open pressure P4. Thus, the fixed open abnormality of the purge valve 16 can be detected and distinguished from other abnormalities including the leakage abnormality and the fixed closed abnormality of the purge valve 16. Therefore, when the fixed open abnormality of the purge valve 16 is generated, it can be prevented that the leakage abnormality or the fixed closed abnormality of the purge valve 16 is erroneously determined.

When the fixed open abnormality of the purge valve 16 is generated, the first difference increases in accordance with a decrease in fixed opening degree of the purge valve 16. According to the first embodiment, a value obtained by subtracting the purge-valve open pressure P4 from the atmospheric pressure P1 is calculated as the first difference between the purge-valve open pressure P4 and the atmospheric pressure P1. The fixed opening degree of the purge valve 16 is estimated according to the first difference. Therefore, when the fixed open abnormality of the purge valve 16 is generated, the fixed opening degree of the purge valve 16 can be specified.

According to the first embodiment, since the electrical air pump is used as the negative-pressure pump 23, the abnormality diagnosis including the leakage abnormality diagnosis and the purge-valve abnormality diagnosis can be executed by utilizing the negative pressure generated by the negative-pressure pump 23 even though the engine is stopped.

Second Embodiment

Next, referring to FIGS. 10 to 14, a second embodiment according to the present disclosure will be described. The substantially same parts and the components as the first embodiment are indicated with the same reference numeral and the same description will not be reiterated. Hereafter, features of the second embodiment different from the first embodiment will be detailed.

Figure 10:
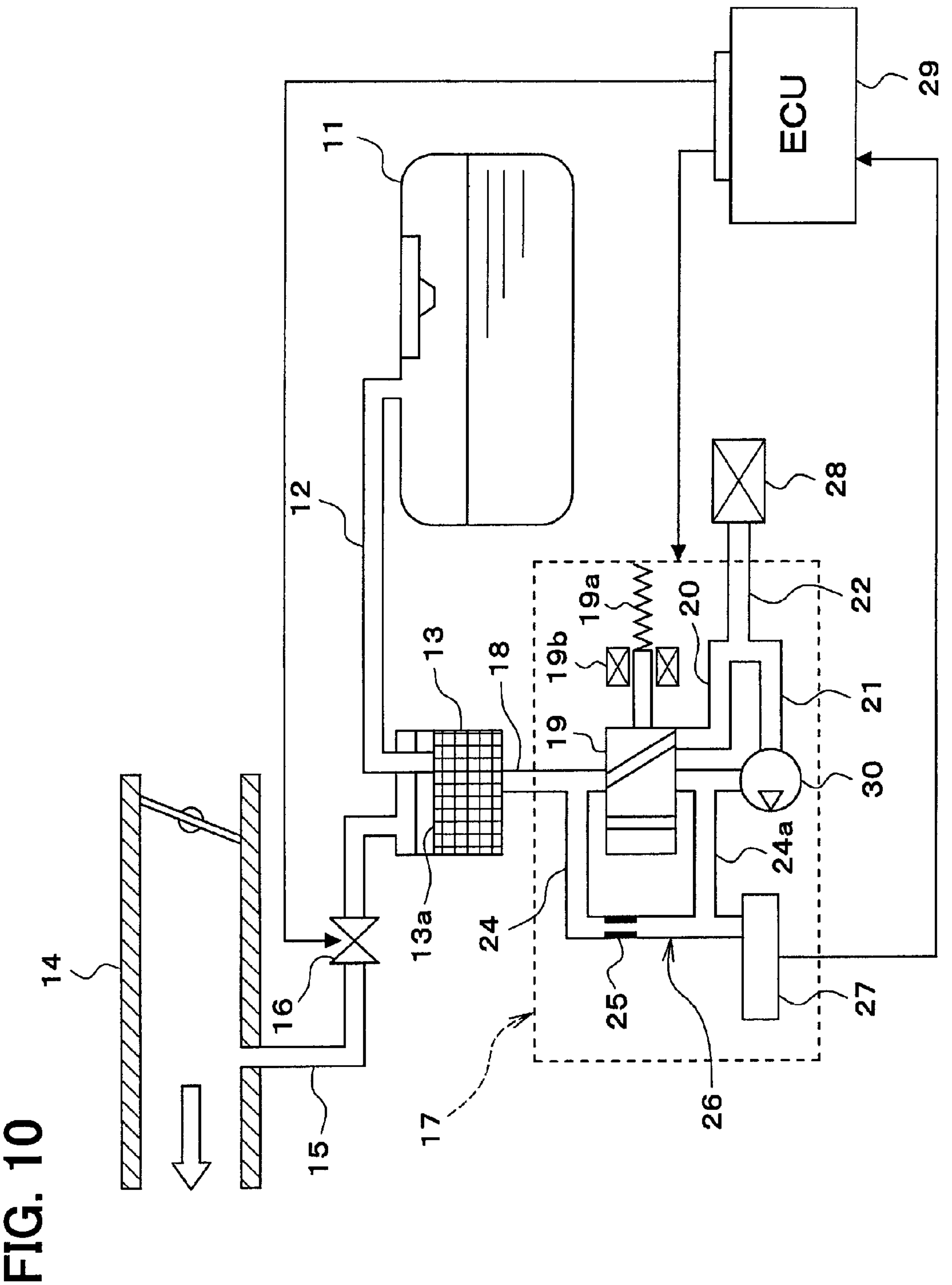
FIG. 10 is a schematic diagram showing an outline of the evaporated-gas purge system according to a second embodiment of the present disclosure.

According to the second embodiment, as shown in FIG. 10, the pump-pressure introducing passage 21 is provided with a positive-pressure pump 30. According to the present embodiment, the positive-pressure pump 30 is a pressure introducing portion. The positive-pressure pump 30 is an electrical air pump driven by a motor. The positive-pressure pump 30 introduces a positive pressure in the evaporation system. In other words, the positive-pressure pump 30 feeds a gas from the atmosphere communication passage 22 towards the canister communication passage 18. According to the present embodiment, the positive pressure is higher than the atmospheric pressure P1. Other configurations of the evaporated-gas purge system are as the same as those of the evaporated-gas purge system according to the first embodiment.

Figure 13:
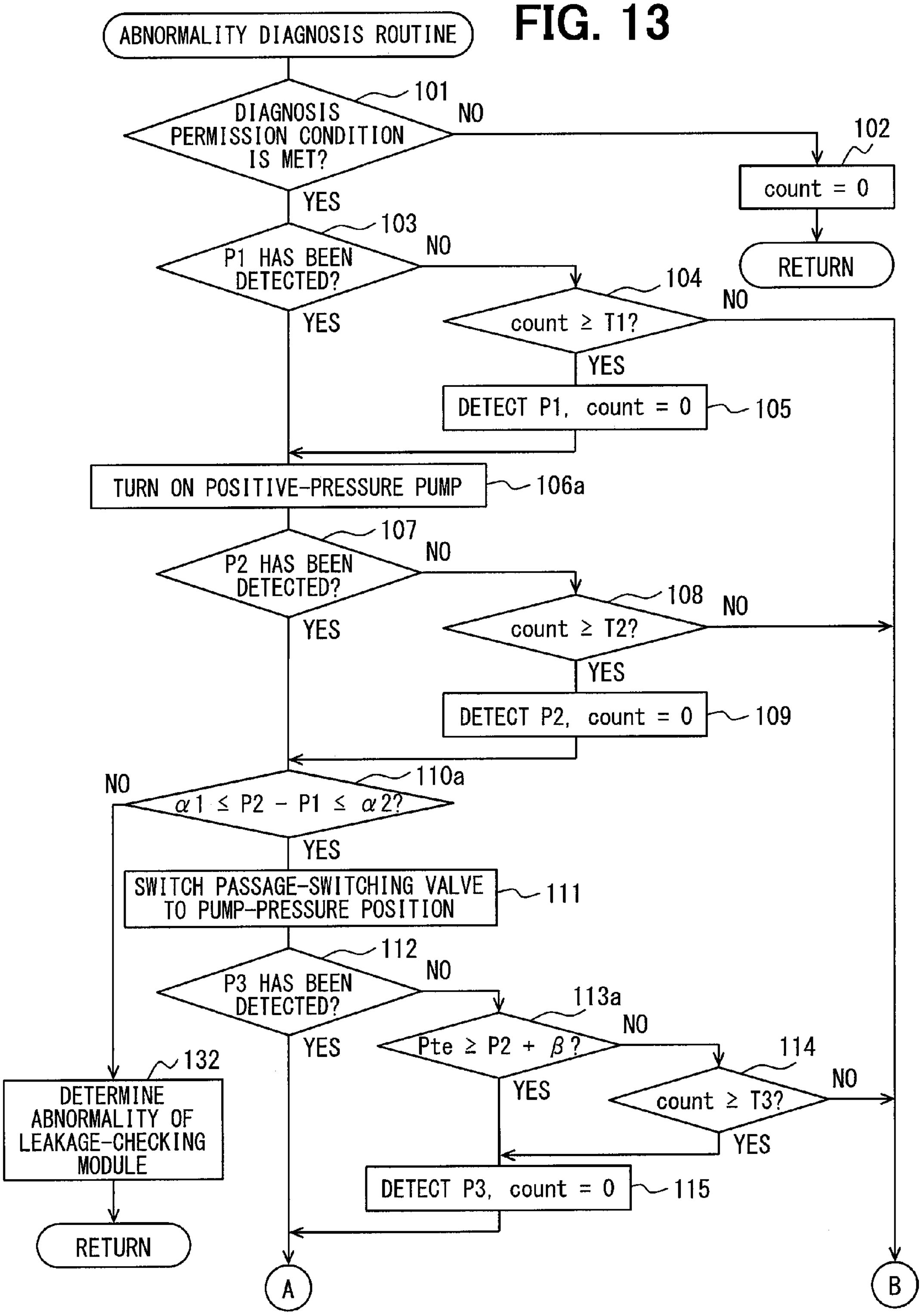
FIG. 13 is a flowchart showing a part of the abnormality diagnosis routine according to the second embodiment.
Figure 14:
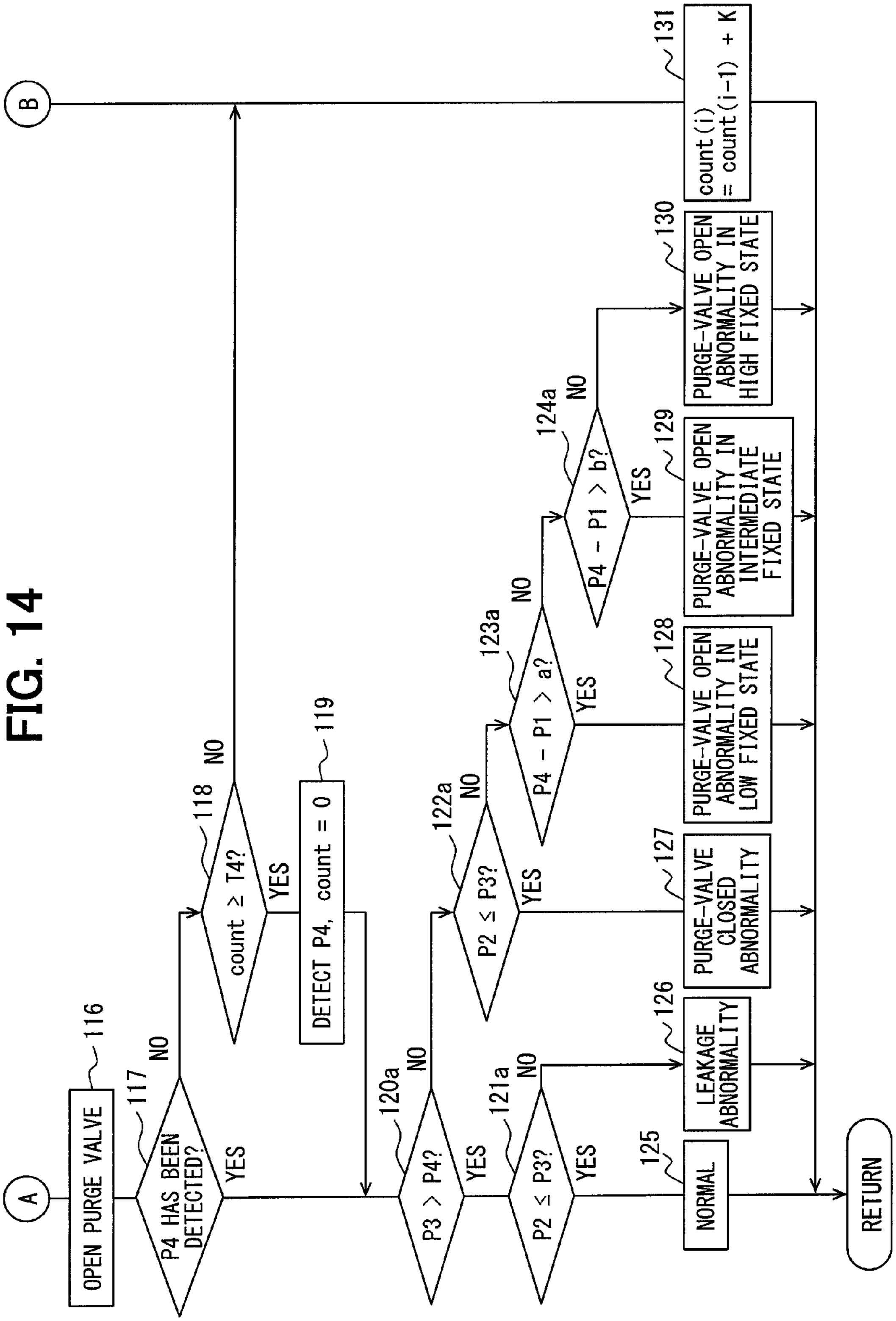
FIG. 14 is a flowchart showing another part of the abnormality diagnosis routine according to the second embodiment.

According to the second embodiment, referring to FIGS. 13 and 14, since the abnormality diagnosis routine is executed by the ECU 29, the leak abnormality diagnosis and the purge-valve abnormality diagnosis are executed in the stop of the engine.

Figure 11:
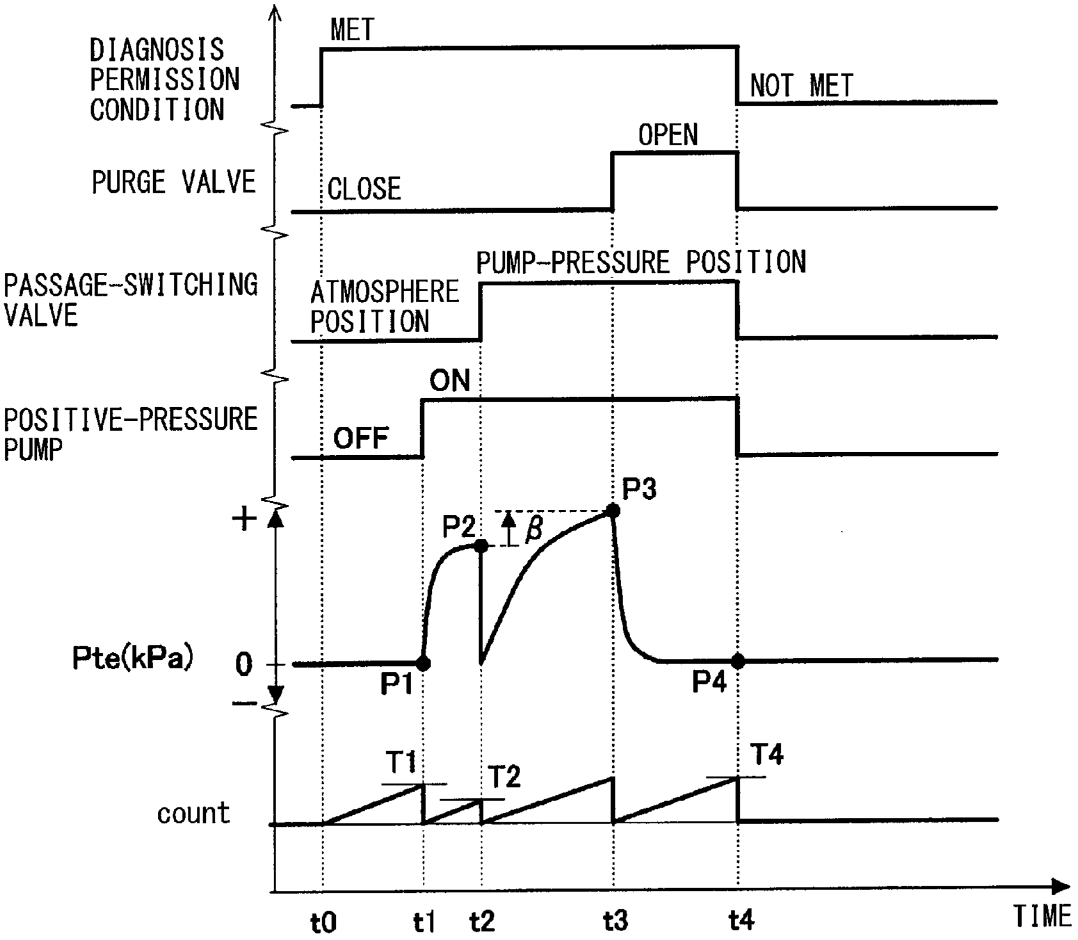
FIG. 11 is a time chart showing the detected pressure of when the evaporated-gas purge system is normal, according to the second embodiment.

As shown in FIG. 11, the ECU 29 starts the reference-pressure detecting operation after detecting the atmospheric pressure P1. In the reference-pressure detecting operation, the ECU 29 turns on the positive-pressure pump 30 and introduces the positive pressure into the reference-pressure detecting portion 26. The ECU 29 determines that the positive pressure in the reference-pressure detecting portion 26 stabilizes in the vicinity of the reference pressure P2 correlative to the reference orifice 25, and detects the pressure Pte in the reference-pressure detecting portion 26 by utilizing the pressure sensor 27 as the reference pressure P2 at the time point t2 that the second predetermined period T2 has elapsed after the positive pressure starts to be introduced into the reference-pressure detecting portion 26. In this case, the time point t2 may be a time point that the pressure in the reference-pressure detecting portion 26 becomes stable.

The ECU 29 starts the first evaporation-system pressure detecting operation after detecting the reference pressure P2. In the first evaporation-system pressure detecting operation, the passage-switching valve 19 is switched to the pump-pressure position, and the positive pressure is introduced into the evaporation system according to the positive-pressure pump 30. In this case, when the evaporated-gas purge system is normal as shown in FIG. 11, the pressure in the evaporation system is higher than the reference pressure P2 in a short time. The ECU 29 detects the pressure Pte in the evaporation system by utilizing the pressure sensor 27 as the purge-valve closed pressure P3 at a time point t3 that the pressure Pte in the evaporation system detected by the pressure sensor 27 becomes equal to a higher determination pressure (P2+β). In this case, the higher determination pressure is a pressure higher than the reference pressure P2 by the predetermined pressure β, and the time point t3 may be a time point that the third predetermined period T3 has elapsed after the positive pressure starts to be introduced into the evaporation system.

The ECU 29 starts the second evaporation-system pressure detecting operation after detecting the purge-valve closed pressure P3. In the second evaporation-system pressure detecting operation, the purge valve 16 is switched to be open (the open state). In this case, when the evaporated-gas purge system is normal as shown in FIG. 11, the pressure in the evaporation system is decreased to be in the vicinity of the atmospheric pressure in a short time. For example, the pressure in the evaporation system is decreased to be in the vicinity of OkPa. The ECU 29 detects the pressure Pte in the evaporation system by utilizing the pressure sensor 27 as the purge-valve open pressure P4 at the time point t4 that the fourth predetermined period T4 has elapsed after the purge valve 16 is switched to the open state.

As shown in FIG. 11, when the evaporated-gas purge system is normal, the purge-valve closed pressure P3 is higher than the reference pressure P2 (P2<P3). Further, the purge-valve open pressure P4 is lower than the purge-valve closed pressure P3 (P3>P4).

When the leakage abnormality of the evaporation system is generated and the ECU 29 executes the first evaporation-system pressure detecting operation, the atmosphere is introduced from the leakage hole even though the positive pressure is introduced into the evaporation system. Therefore, an increasing rate of the pressure in the evaporation system becomes slow, and the pressure in the evaporation system is not increased to the reference pressure P2. Thus, the purge-valve closed pressure P3 is lower than the reference pressure P2 (P2>P3). Then, when the ECU 29 executes the second evaporation-system pressure detecting operation and the purge valve 16 is switched to the open state, the pressure in the evaporation system is decreased to be in the vicinity of the atmospheric pressure. Therefore, the purge-valve open pressure P4 is lower than the purge-valve closed pressure P3 (P3>P4).

When the fixed closed abnormality of the purge valve 16 is generated and the ECU 29 executes the first evaporation-system pressure detecting operation and the positive pressure is introduced into the evaporation system, the pressure in the evaporation system becomes higher than the reference pressure P2 in a short time as the same as the pressure of when the evaporated-gas purge system is normal as shown in FIG. 11. Thus, the purge-valve closed pressure P3 is higher than the reference pressure P2 (P2<P3). Then, when the ECU 29 executes the second evaporation-system pressure detecting operation, the purge valve 16 is fixed to the closed state even though the purge valve 16 is controlled to be switched to the open state. Therefore, the pressure in the evaporation system is continuously increased. In other words, the pressure in the evaporation system is not decreased. Thus, the purge-valve open pressure P4 is higher than the purge-valve closed pressure P3 (P3<P4).

Figure 12:
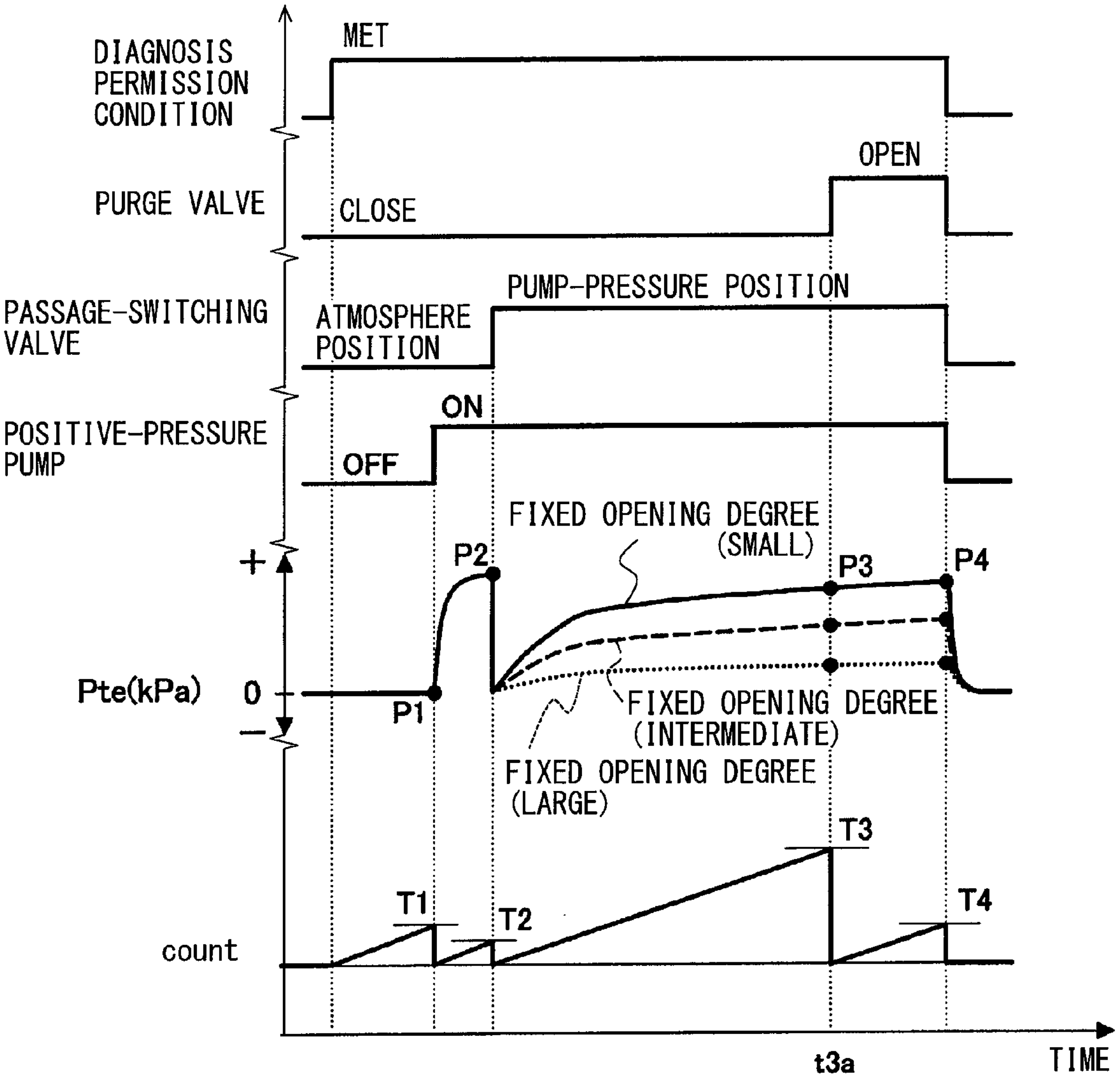
FIG. 12 is a time chart showing the detected pressure of when the fixed open abnormality of the purge valve is generated, according to the second embodiment.

As shown in FIG. 12, the fixed open abnormality of the purge valve 16 is generated. In this case, when the ECU 29 executes the first evaporation-system pressure detecting operation, even though the positive pressure is introduced into the evaporation system, the purge valve 16 is fixed to the open state and the atmosphere is introduced from the purge valve 16. Therefore, the increasing rate of the pressure in the evaporation system becomes slow, and the pressure in the evaporation system is not increased to the reference pressure P2. Thus, the ECU 29 detects the pressure Pte in the evaporation system by utilizing the pressure sensor 27 as the purge-valve closed pressure P3 at a time point t3*a* that the third predetermined period T3 has elapsed after the positive pressure starts to be introduced into the evaporation system, and the purge-valve closed pressure P3 is lower than the reference pressure P2 (P2>P3). Then, when the ECU 29 executes the second evaporation-system pressure detecting operation, the purge valve 16 is fixed to the open state even though the purge valve 16 is controlled to be switched to the open state. Therefore, the pressure in the evaporation system is continuously increased. In other words, the pressure in the evaporation system is not decreased. Thus, the purge-valve open pressure P4 is higher than the purge-valve closed pressure P3 (P3<P4).

As the above description, considering the magnitude relation between the reference pressure P2 and the purge-valve closed pressure P3 and the magnitude relation between the purge-valve closed pressure P3 and the purge-valve open pressure P4, the abnormality state can determined as followings.

(1) When the purge-valve closed pressure P3 is higher than or equal to the reference pressure P2 and the purge-valve open pressure P4 is lower than the purge-valve closed pressure P3 (P2≤P3 and P3>P4) as shown in FIG. 11, the ECU 29 determines that the evaporated-gas purge system is normal.

(2) When the purge-valve closed pressure P3 is lower than the reference pressure P2 and the purge-valve open pressure P4 is lower than the purge-valve closed pressure P3 (P2>P3 and P3>P4), the ECU 29 determines that the leakage abnormality of the evaporation system is generated.

(3) When the purge-valve closed pressure P3 is higher than or equal to the reference pressure P2 and the purge-valve open pressure P4 is higher than or equal to the purge-valve closed pressure P3 (P2≤P3 and P3≤P4), the ECU 29 determines that the fixed closed abnormality of the purge valve 16 is generated.

(4) When the purge-valve closed pressure P3 is lower than the reference pressure P2 and the purge-valve open pressure P4 is higher than or equal to the purge-valve closed pressure P3 (P2>P3 and P3≤P4) as shown in FIG. 12, the ECU 29 determines that the fixed open abnormality of the purge valve 16 is generated.

When the ECU 29 determines that the fixed open abnormality of the purge valve 16 is generated, the ECU 29 calculated a value obtained by subtracting the atmospheric pressure P1 from the purge-valve open pressure P4 as a third difference (P4−P1) between the purge-valve open pressure P4 and the atmospheric pressure P1. Then, the ECU 29 compares the third difference (P4−P1) with the first determination threshold a and the second determination threshold b. According to the present embodiment, the first determination threshold a is greater than the second determination threshold b. When the ECU 29 determines that the third difference (P4−P1) is greater than the first determination threshold a, the ECU 29 determines the low fixed state of the purge valve 16. When the ECU 29 determines that the third difference (P4−P1) is less than or equal to the first determination threshold a and the third difference (P4−P1) is greater than the second determination threshold b, the ECU 29 determines the intermediate fixed state of the purge valve 16. When the ECU 29 determines that the third difference (P4−P1) is less than or equal to the second determination threshold b, the ECU 29 determines the high fixed state of the purge valve 16.

Hereafter, referring to FIGS. 13 and 14, the abnormality diagnosis routine executed by the ECU 29 according to the second embodiment will be described.

In addition, the operations in 106, 110, 113, and 120 to 124 according to the first embodiment are changed to operations in 106*a*, 110*a*, 113*a*, and 120*a* to 124*a* according to the second embodiment, and other operations in the abnormality diagnosis routine according to the second embodiment are as the same as the operations in the abnormality diagnosis routine according to the first embodiment.

In the abnormality diagnosis routine as shown in FIGS. 13 and 14, at 101, the ECU 29 determines whether the diagnosis permission condition is met. When the ECU 29 determines that the diagnosis permission condition is met at 101, the ECU 29 proceeds to 103. At 103, the ECU 29 determines whether the atmospheric pressure P1 has been detected. When the ECU 29 determines that the atmospheric pressure P1 has not been detected at 103, the ECU 29 proceeds to 104. At 104, the ECU 29 determines whether the count value Count has reached the first predetermined period T1.

When the ECU 29 determines that the count value Count has not reached the first predetermined period T1 at 104, the ECU 29 proceeds to 105. At 105, the ECU 29 detects the pressure Pte in the reference-pressure detecting portion 26 by utilizing the pressure sensor 27 as the atmospheric pressure P1 and stores the atmospheric pressure P1, and resets the count value Count. Then, the ECU 29 executes the reference-pressure detecting operation from 106*a* to 109. When the ECU 29 determines that the atmospheric pressure P1 has been detected at 103, the ECU 29 executes the reference-pressure detecting operation from 106*a* to 109, without executing operations in 104 and 105.

In the reference-pressure detecting operation, at 106, the ECU 29 maintains the closed state of the purge valve 16, maintains the passage-switching valve 19 to the atmosphere position, turns on the positive-pressure pump 30, and introduces the positive pressure into the reference-pressure detecting portion 26.

At 107, the ECU 29 determines whether the reference pressure P2 has been detected. When the ECU 29 determines that the reference pressure P2 has not been detected at 107, the ECU 29 proceeds to 108. At 108, the ECU 29 determines whether the count value Count has reached the second predetermined period T2.

When the ECU 29 determines that the count value Count has reached the second predetermined period T2 at 108, the ECU 29 proceeds to 109. At 109, the ECU 29 detects the pressure Pte in the reference-pressure detecting portion 26 by utilizing the pressure sensor 27 as the reference pressure P2 and stores the reference pressure P2, resets the count value Count, and proceeds to 110*a*. When the ECU 29 determines that the reference pressure P2 has been detected at 107, the ECU 29 directly proceeds to 110*a* without executing operations in 108 and 109.

At 110*a*, the ECU 29 determines whether a fourth difference (P2−P1) between the reference pressure P2 and the atmospheric pressure P1 is in a normal range. Specifically, the ECU 29 determines whether the fourth difference (P2−P1) is no less than the lower limit $\alpha$1 and is no greater than the upper limit $\alpha$2. According to the present embodiment, the fourth difference (P2−P1) is a value obtained by subtracting the atmospheric pressure P1 from the reference pressure P2.

When the ECU 29 determines that the fourth difference (P2−P1) is out of the normal range, the ECU 29 proceeds to 132. Specifically, when the ECU 29 determines that the fourth difference (P2−P1) is less than the lower limit $\alpha$1 or is greater than the upper limit $\alpha$2, the ECU 29 proceeds to 132. At 132, the ECU 29 determines that the abnormality of the leakage-checking module 17 is generated and terminates the present routine. When the ECU 29 determines that the fourth difference (P2−P1) is out of the normal range, the ECU 29 turns off the positive-pressure pump 30, switches the passage-switching valve 19 to the atmosphere position, switches the purge valve 16 to the closed state, and terminates the abnormality diagnosis routine. In this case, the ECU 29 changes the diagnosis permission condition to be not met.

When the ECU 29 determines that the fourth difference (P2−P1) is in the normal range at 110*a*, the ECU 29 executes the first evaporation-system pressure detecting operation from 111 to 115.

In the first evaporation-system pressure detecting operation, at 111, the ECU 29 maintains the purge valve 16 to the closed state, maintains the positive-pressure pump 30 to be turned on, switches the passage-switching valve 19 to the pump-pressure position, and introduces the positive pressure into the evaporation system by utilizing the positive-pressure pump 30.

At 112, the ECU 29 determines whether the purge-valve closed pressure P3 has been detected. When the ECU 29 determines that the purge-valve closed pressure P3 has not been detected at 112, the ECU 29 proceeds to 113*a*. At 113*a*, the ECU 29 determines whether the pressure Pte in the evaporation system detected by the pressure sensor 27 is higher than or equal to the higher determination pressure (P2+$\beta$). When the ECU 29 determines that the pressure Pte in the evaporation system is lower than the higher determination pressure (P2+$\beta$), the ECU 29 proceeds to 114. At 114, the ECU 29 determines whether the count value Count has reached the third predetermined period T3.

When the ECU 29 determines that the pressure Pte in the evaporation system is higher than or equal to the higher determination pressure (P2+$\beta$) at 113*a* or the count value Count has reached the third predetermined period T3 at 114, the ECU 29 proceeds to 115. At 115, the ECU 29 detects the pressure Pte in the evaporation system by utilizing the pressure sensor 27 as the purge-valve closed pressure P3 and stores the purge-valve closed pressure P3, and resets the count value Count to the initial value. Then, the ECU 29 executes the second evaporation-system pressure detecting operation from 116 to 119. When the ECU 29 determines that the purge-valve closed pressure P3 has been detected at 112, the ECU 29 executes the second evaporation-system pressure detecting portion from 116 to 119, without executing operations in 113 to 115.

In the second evaporation-system pressure detecting operation, at 116, the ECU 29 maintains the passage-switching valve 19 to the pump-pressure position, maintains the positive-pressure pump 30 to be turned on, and switches the purge valve 16 to the open state.

At 117, the ECU 29 determines whether the purge-valve open pressure P4 has been detected. When the ECU 29 determines that the purge-valve open pressure P4 has not been detected at 117, the ECU 29 proceeds to 118. At 118, the ECU 29 determines whether the count value Count has reached the fourth predetermined period T4.

When the ECU 29 determines that the count value Count has reached the fourth predetermined period T4 at 118, the ECU 29 proceeds to 119. At 119, the ECU 29 detects the pressure Pte in the evaporation system by utilizing the pressure sensor 27 as the purge-valve open pressure P4 and stores the purge-valve open pressure P4, and resets the count value Count. Then, the ECU 29 executes the abnormality diagnosis operation from 120*a* to 130. When the ECU 29 determines that the purge-valve open pressure P4 has been detected at 117, the ECU 29 executes the abnormality diagnosis operation from 120*a* to 130, without executing operations in 118 and 119.

In the abnormality diagnosis operation, at 120*a*, the ECU 29 determines whether the purge-valve open pressure P4 is lower than the purge-valve closed pressure P3. In other words, the ECU 29 determines whether the pressure in the evaporation system is decreased when the purge valve 16 is switched to the open state.

When the ECU 29 determines that the purge-valve open pressure P4 is lower than the purge-valve closed pressure P3 (P3>P4) at 120*a*, the ECU 29 determines that the purge valve 16 is normal and proceeds to 121*a*. At 121*a*, the ECU 29 determines whether the purge-valve closed pressure P3 is higher than or equal to the reference pressure P2 (P2≤P3).

When the ECU 29 determines that the purge-valve closed pressure P3 is higher than or equal to the reference pressure P2 at 121*a*, the ECU 29 determines that the evaporation system is normal and proceeds to 125. At 125, the ECU 29 determines that the evaporated-gas purge system is normal and terminates the present routine.

When the ECU 29 determines that the purge-valve closed pressure P3 is lower than the reference pressure P2 (P2>P3) at 121*a*, the ECU 29 proceeds to 126. At 126, the ECU 29 determines that the leakage abnormality of the evaporation system is generated and terminates the present routine.

When the ECU 29 determines that the purge-valve open pressure P4 is higher than or equal to the purge-valve closed pressure P3 (P3≤P4) at 120*a*, the ECU 29 determines that the abnormality of the purge valve 16 is generated and proceeds to 122*a*. In other words, when the ECU 29 determines that the pressure in the evaporation system is not decreased, the ECU 29 determines that the abnormality of the purge valve 16 is generated and proceeds to 122*a*. At 122*a*, the ECU 29 determines whether the purge-valve closed pressure P3 is higher than or equal to the reference pressure P2 (P2≤P3).

When the ECU 29 determines that the purge-valve closed pressure P3 is higher than or equal to the reference pressure P2 at 122*a*, the ECU 29 determines that the purge valve 16 is fixed to the closed state and proceeds to 127. At 127, the ECU 29 determines that the fixed closed abnormality of the purge valve 16 is generated and terminates the present routine.

When the ECU 29 determines that the purge-valve closed pressure P3 is lower than the reference pressure P2 (P2>P3) at 122*a*, the ECU 29 determines that the purge valve 16 is fixed to the open state and proceeds to 123*a*. At 123*a*, the ECU 29 determines whether the third difference (P4−P1) is greater than the first determination threshold a (P4−P1>a).

When the ECU 29 determines that the third difference (P4−P1) is greater than the first determination threshold a at 123*a*, the ECU 29 proceeds to 128. At 128, the ECU 29 determines that the fixed open abnormality of the purge valve 16 is in the low fixed state of the purge valve 16 and terminates the present routine.

When the ECU 29 determines that the third difference (P4−P1) is less than or equal to the first determination threshold a (P4−P1≤a) at 123*a*, the ECU 29 proceeds to 124*a*. At 124*a*, the ECU 29 determines whether the third difference (P4−P1) is greater than the second determination threshold b (P4−P1>b).

When the ECU 29 determines that the third difference (P4−P1) is greater than the second determination threshold b at 124*a*, the ECU 29 proceeds to 129. At 129, the ECU 29 determines that the fixed open abnormality of the purge valve 16 is in the intermediate fixed state of the purge valve 16 and the ECU 29 terminates the present routine.

When the ECU 29 determines that the third difference (P4−P1) is less than or equal to the second determination threshold b (P4−P1>b) at 124*a*, the ECU 29 proceeds to 130. At 130, the ECU 29 determines that the fixed open abnormality of the purge valve 16 is in the high fixed state of the purge valve 16 and the ECU 29 terminates the present routine.

Further, the ECU 29 turns off the positive-pressure pump 30, switches the passage-switching valve 19 to the atmosphere position, switches the purge valve 16 to the closed state, and terminates the abnormality diagnosis, after the ECU 29 executes operations in 125 to 130. In this case, the ECU 29 makes the diagnosis permission condition to be not met.

According to the above description in the second embodiment, the same effects as those in the first embodiment can be achieved.

According to the above embodiments, the fixed opening degree of the purge valve 16 is specified based on a difference between the atmospheric pressure P1 and the purge-valve open pressure P4 which includes the first difference and the third difference. However, it is not limited, and the fixed opening degree of the purge valve 16 may be specified based on a ratio of the atmospheric pressure P1 to the purge-valve open pressure P4 or a ratio of the purge-valve open pressure P4 to the atmospheric pressure P1.

According to the above embodiments, when the ECU 29 compares an atmosphere information with the purge-valve open pressure P4 to specify the fixed opening degree of the purge valve 16, the atmospheric pressure P1 detected before the reference-pressure detecting operation is executed is used as the atmosphere information.

However, it is not limited. Since the pressure in the evaporation system becomes a value in the vicinity of the atmospheric pressure when the passage-switching valve 19 is switched to the pump-pressure position after the reference pressure P2 is detected, the pressure Pte in the evaporation system detected by the pressure sensor 27 may be used as the atmosphere information.

Alternatively, since the pressure in the evaporation system becomes a value in the vicinity of the atmospheric pressure when the positive-pressure pump 30 is turned off and the passage-switching valve 19 is switched to the atmosphere position and the purge valve 16 is switched to the closed state after the purge-valve open pressure P4 is detected, the pressure Pte in the evaporation system detected by the pressure sensor 27 may be used as the atmosphere information.

According to the above embodiments, the fixed opening degree of the purge valve 16 is specified by three levels. However, it is not limited, and the fixed opening degree of the purge valve 16 may be specified by two levels or four or more levels. Alternatively, the fixed open abnormality of the purge valve 16 may be determined without specifying the fixed opening degree of the purge valve 16.

According to the above embodiments, an electrical air pump which is the negative-pressure pump 23 or the positive-pressure pump 30 is used as the pressure introducing portion. However, it is not limited, and a pressure accumulating tank accumulating a pressure including the negative pressure and the positive pressure in an operation of the internal combustion engine may be provided as the pressure introducing portion.

According to the present disclosure, a configuration of the evaporated-gas purge system or the leakage-checking module can be properly changed, and can be applied to various embodiments which are also within the spirit and scope of the present disclosure.

What is claimed is:

1. An abnormality diagnosis device for an evaporated-gas purge system, the evaporated-gas purge system including a purge valve opening and closing a purge passage purging an evaporated gas generated according to an evaporation of a fuel in a fuel tank to an intake system of an internal combustion engine, the abnormality diagnosis device comprising:

a pressure introducing portion introducing a pressure into an evaporation system from the fuel tank to the purge valve;

a pressure detecting portion detecting a pressure in the evaporation system;

a reference-pressure detecting portion including a reference orifice having a predetermined diameter; and an abnormality diagnosis portion executing (i) a reference-pressure detecting operation to introduce a pressure into the reference-pressure detecting portion by utilizing the pressure introducing portion so as to detect a reference pressure correlative to the reference orifice, (ii) a first evaporation-system pressure detecting operation to detect a purge-valve closed pressure that is a pressure in the evaporation system of when a pressure is introduced into the evaporation system by the pressure introducing portion after the purge valve is controlled to be closed, and (iii) a second evaporation-system pressure detecting operation to detect a purge-valve open pressure that is a pressure in the evaporation system of when a pressure is introduced into the evaporation system by the pressure introducing portion after the purge valve is controlled to be open, and the abnormality diagnosis portion determining whether a leakage abnormality of the evaporation system and a fixed open abnormality of the purge valve in which the purge valve is fixed to be open are generated, based on a magnitude relation between the reference pressure, the purge-valve closed pressure, and the purge-valve open pressure.

2. The abnormality diagnosis device for the evaporated-gas purge system according to claim 1, wherein when the abnormality diagnosis portion determines that the fixed open abnormality of the purge valve is generated, the abnormality diagnosis portion specifies a fixed opening degree of the pressure valve by comparing an atmosphere information that is an atmospheric pressure or a pressure correlative to the atmospheric pressure with the purge-valve open pressure.

3. The abnormality diagnosis device for the evaporated-gas purge system according to claim 2, wherein the abnormality diagnosis portion determines that the fixed opening degree of the purge valve decreases in accordance with an increase in difference between the purge-valve open pressure and the atmosphere information.

4. The abnormality diagnosis device for the evaporated-gas purge system according to claim 1, wherein the pressure introducing portion is an electrical air pump that introduces a negative pressure or a positive pressure into the evaporation system.

* * * * *